(12) United States Patent
Sobecki et al.

(10) Patent No.: US 10,889,265 B2
(45) Date of Patent: Jan. 12, 2021

(54) VEHICLE FUNCTION CONTROL SYSTEM USING SENSING AND ICON DISPLAY MODULE

(71) Applicant: MAGNA MIRRORS OF AMERICA, INC., Holland, MI (US)

(72) Inventors: Justin E. Sobecki, Rockford, MI (US); David P. O'Connell, Ada, MI (US); Kenneth C. Peterson, Ada, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/819,668

(22) Filed: Mar. 16, 2020

(65) Prior Publication Data

US 2020/0216023 A1    Jul. 9, 2020

Related U.S. Application Data

(63) Continuation of application No. 15/127,810, filed as application No. PCT/US2015/022398 on Mar. 25, 2015, now Pat. No. 10,589,716.

(Continued)

(51) Int. Cl.
*B60R 25/20* (2013.01)
*G06F 3/042* (2006.01)
(Continued)

(52) U.S. Cl.
CPC ........ *B60R 25/2054* (2013.01); *B60Q 1/0023* (2013.01); *G06F 3/0425* (2013.01);
(Continued)

(58) Field of Classification Search
CPC . B60R 25/2054; B60Q 1/0023; G06F 3/0425; G06F 3/04817
See application file for complete search history.

(56) References Cited

U.S. PATENT DOCUMENTS

| 2,023,845 A | 12/1935 | Larose |
| 2,276,104 A | 3/1942 | Shaunessey |

(Continued)

FOREIGN PATENT DOCUMENTS

| CN | 1777983 A | 5/2006 |
| CN | 101519935 A | 9/2009 |

(Continued)

OTHER PUBLICATIONS

International Search Report and Written Opinion dated Jul. 2, 2015 from corresponding PCT Application No. PCT/US2015/022398.

(Continued)

*Primary Examiner* — James J Yang
(74) *Attorney, Agent, or Firm* — Honigman LLP

(57) ABSTRACT

A vehicular sensing device for a vehicular function control system includes a plurality of sensors and at least one illumination source operable to backlight a plurality of icons at a cover element, each icon of the plurality of icons representative of a respective vehicle function. With the vehicular sensing device disposed at a vehicle, and with the at least one illumination source activated to backlight the plurality of icons, the backlit icons are viewable at an exterior portion of the vehicle, and each sensor of the plurality of sensors has a respective field of sensing associated with a respective icon of the plurality of icons. Responsive to sensing by one of the sensors of proximity or movement of a user in the field of sensing of that sensor, a controller generates an output to control the vehicle function that is represented by the respective backlit icon associated with that sensor.

31 Claims, 27 Drawing Sheets

Related U.S. Application Data

(60) Provisional application No. 62/089,543, filed on Dec. 9, 2014, provisional application No. 62/011,206, filed on Jun. 12, 2014, provisional application No. 62/008,098, filed on Jun. 5, 2014, provisional application No. 61/970,582, filed on Mar. 26, 2014.

(51) Int. Cl.
  *B60Q 1/00* (2006.01)
  *G06F 3/0481* (2013.01)

(52) U.S. Cl.
  CPC ...... *G06F 3/04817* (2013.01); *B60Q 2400/40* (2013.01); *B60Q 2400/50* (2013.01)

(56) References Cited

U.S. PATENT DOCUMENTS

| | | |
|---|---|---|
| 5,371,659 A | 12/1994 | Pastrick et al. |
| 5,497,305 A | 3/1996 | Pastrick et al. |
| 5,669,699 A | 9/1997 | Pastrick et al. |
| 5,823,654 A | 10/1998 | Pastrick et al. |
| 5,929,769 A | 7/1999 | Garnault |
| 6,020,855 A | 2/2000 | Nagy et al. |
| 6,220,737 B1 | 4/2001 | Baragona |
| 6,349,450 B1 | 2/2002 | Koops et al. |
| 6,496,107 B1 | 12/2002 | Himmelstein |
| 6,542,071 B1 | 4/2003 | Ohtsubo et al. |
| 6,550,103 B2 | 4/2003 | Koops et al. |
| 6,654,070 B1 | 11/2003 | Rofe |
| 6,685,347 B2 | 2/2004 | Grutze |
| 6,690,268 B2 | 2/2004 | Schofield et al. |
| 7,175,321 B1 | 2/2007 | Lopez |
| 7,195,381 B2 | 3/2007 | Lynam et al. |
| 7,248,151 B2 | 7/2007 | McCall |
| 7,255,451 B2 | 8/2007 | McCabe et al. |
| 7,289,037 B2 | 10/2007 | Uken et al. |
| 7,626,749 B2 | 12/2009 | Baur et al. |
| 7,821,388 B1 | 10/2010 | Booth et al. |
| 8,091,280 B2 | 1/2012 | Hanzel et al. |
| 8,154,418 B2 | 4/2012 | Peterson et al. |
| 8,519,362 B2 | 8/2013 | Labrot et al. |
| 8,801,245 B2 | 8/2014 | De Wind et al. |
| 10,589,716 B2 | 3/2020 | Sobecki et al. |
| 2004/0184282 A1 | 9/2004 | Nishijima et al. |
| 2005/0156743 A1 | 7/2005 | Gallivan et al. |
| 2006/0145825 A1 | 7/2006 | McCall |
| 2007/0285510 A1 | 12/2007 | Lipton et al. |
| 2008/0122799 A1 | 5/2008 | Pryor |
| 2008/0296926 A1* | 12/2008 | Hanzel ................. H03K 17/941 296/146.1 |
| 2010/0253919 A1 | 10/2010 | Douglas |
| 2011/0157908 A1* | 6/2011 | Iwai ..................... G02B 6/009 362/509 |
| 2011/0248820 A1 | 10/2011 | Gehin |
| 2011/0273671 A1 | 11/2011 | Chu |
| 2012/0020102 A1 | 1/2012 | Lambert et al. |
| 2012/0069444 A1 | 3/2012 | Campbell et al. |
| 2012/0089273 A1 | 4/2012 | Seder et al. |
| 2012/0293462 A1 | 11/2012 | Backes |
| 2013/0130674 A1 | 5/2013 | De Wind et al. |
| 2014/0039766 A1 | 2/2014 | Miyake et al. |
| 2014/0330486 A1* | 11/2014 | Gehin ................... B60R 25/01 701/49 |
| 2015/0084739 A1* | 3/2015 | Lemoult ............... G06F 3/0202 340/5.54 |
| 2015/0224919 A1 | 8/2015 | Sobecki et al. |

FOREIGN PATENT DOCUMENTS

| | | |
|---|---|---|
| CN | 102109135 A | 6/2011 |
| CN | 202152039 U | 2/2012 |
| CN | 202264698 U | 6/2012 |
| DE | 4409167 C1 | 6/1995 |
| DE | 4440855 A1 | 5/1996 |
| DE | 19818263 A1 | 10/1999 |
| DE | 19937086 A1 | 2/2000 |
| DE | 19848001 A1 | 4/2000 |
| DE | 102006030639 A1 | 7/2007 |
| DE | 102006044112 A1 | 3/2008 |
| EP | 1793261 A1 | 6/2007 |
| EP | 2034116 A1 | 3/2009 |
| EP | 2196359 A1 | 6/2010 |
| GB | 2489805 A | 10/2012 |
| JP | 2004100184 A | 4/2004 |
| JP | 2004100388 A | 4/2004 |
| JP | 2005133529 A | 5/2005 |
| JP | 2007327268 A | 12/2007 |
| JP | 2009079353 A | 4/2009 |
| JP | 2009084788 A | 4/2009 |
| JP | 2011033785 A | 2/2011 |
| KR | 2006134756 | 12/2006 |
| KR | 2007049338 | 5/2007 |
| WO | 2008/076914 A1 | 6/2008 |
| WO | 2010/023348 A1 | 3/2010 |
| WO | 2011044312 A1 | 4/2011 |
| WO | 2012/051500 A1 | 4/2012 |
| WO | 2013/018099 A2 | 2/2013 |
| WO | 2013037806 A1 | 3/2013 |
| WO | 2013071070 A1 | 5/2013 |

OTHER PUBLICATIONS

Chinese Office Action dated Oct. 18, 2018 from corresponding Chinese Patent Application No. 201580016036.1.
Chinese Office Action dated Mar. 21, 2019 from corresponding Chinese Patent Application No. 201580016036.1.
Chinese Office Action and Search Report dated Aug. 16, 2019 from corresponding Chinese Patent Application No. 201580016036.1.

* cited by examiner

VEHICLE FUNCTION CONTROL SYSTEM USING SENSING AND ICON DISPLAY MODULE

CROSS REFERENCE TO RELATED APPLICATIONS

The present application is a continuation of U.S. patent application Ser. No. 15/127,810, filed Sep. 21, 2016, now U.S. Pat. No. 10,589,716, which is a 371 national phase filing of PCT Application No. PCT/US2015/022398, filed Mar. 25, 2015, which claims the filing benefits of U.S. provisional applications, Ser. No. 62/089,543, filed Dec. 9, 2014, Ser. No. 62/011,206, filed Jun. 12, 2014, Ser. No. 62/008,098, filed Jun. 5, 2014, and Ser. No. 61/970,582, filed Mar. 26, 2014, which are hereby incorporated herein by reference in their entireties.

FIELD OF THE INVENTION

The present invention relates to illumination modules for vehicles and, more particularly, to an illumination module that projects an icon or image onto the ground at or near the vehicle.

BACKGROUND OF THE INVENTION

It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654 and 5,497,305, which are hereby incorporated herein by reference in their entireties. Typically, such lighting devices provide illumination along the side of the vehicle and down to the ground at the side of the vehicle.

SUMMARY OF THE INVENTION

The present invention provides an illumination and sensing module or device for a vehicle, such as for an exterior mirror assembly, for providing illumination at the side or rear door of the vehicle, and for sensing the presence of a person or person's foot at an icon projected towards the ground by the vehicle.

According to an aspect of the present invention, a vehicle function control system includes a sensing and projecting module disposed at an exterior portion of the vehicle and having at least one illumination source operable to project a plurality of icons onto one of (i) a ground area at or near the vehicle and (ii) an exterior surface of the vehicle. Each of the projected icons is representative of a respective vehicle function. The sensing and projecting module comprises a sensing device operable to sense the presence of a user at or near one of the projected icons to determine which of the projected icons is being selected by the user. A control (which may be part of the sensing and projecting module and/or may be part of a vehicle control module, such as a body control module of the vehicle or the like) is responsive to an output of the sensing device and, responsive to determination of the user at or near a selected particular projected icon, the control is operable to control a function of the vehicle associated with the selected particular projected icon.

Optionally, the illumination source may comprise at least one light emitting diode, and/or the illumination source may comprise a plurality of illumination sources or light emitting diodes, each associated with a respective one of the icons. The control may be operable to flash one of the illumination sources when a user is determined to be present at or near the selected projected icon associated with that illumination source.

Optionally, the sensing and projecting module may comprise a substantially sealed module. The plurality of projected icons may each associated with a respective one of (i) a vehicle door opening and closing function, (ii) a vehicle window opening and closing function and (iii) a vehicle door locking and unlocking function. The control may be operable to activate the illumination source responsive to a passive entry system or keyless entry system of the vehicle. Optionally, the vehicle function control system may comprise a plurality of sensing and projecting modules, with the sensing and projecting modules disposed at respective ones of (i) a lift gate of the vehicle, (ii) a driver side exterior mirror of the vehicle and (iii) a passenger side exterior mirror of the vehicle.

Thus, the system or systems of the present invention projects a plurality of icons on the ground at or near the vehicle (such as at or near the sides and/or rear of the vehicle), whereby a user may place their foot at or on a selected icon to activate or control an accessory or function associated with that icon. For example, the user may step or otherwise move or position themselves at or on or near an icon (which may be projected onto the ground or portion of the vehicle at the rear or lift gate of the vehicle) representative of a side sliding door of the vehicle to open the side sliding door of the vehicle. The system may determine which of the icons the user selects by determining the presence or proximity of the user's foot at or near the particular icons projected by the projection module.

These and other objects, advantages, purposes and features of the present invention will become apparent upon review of the following specification in conjunction with the drawings.

DESCRIPTION OF THE PREFERRED EMBODIMENTS

Figure 1:
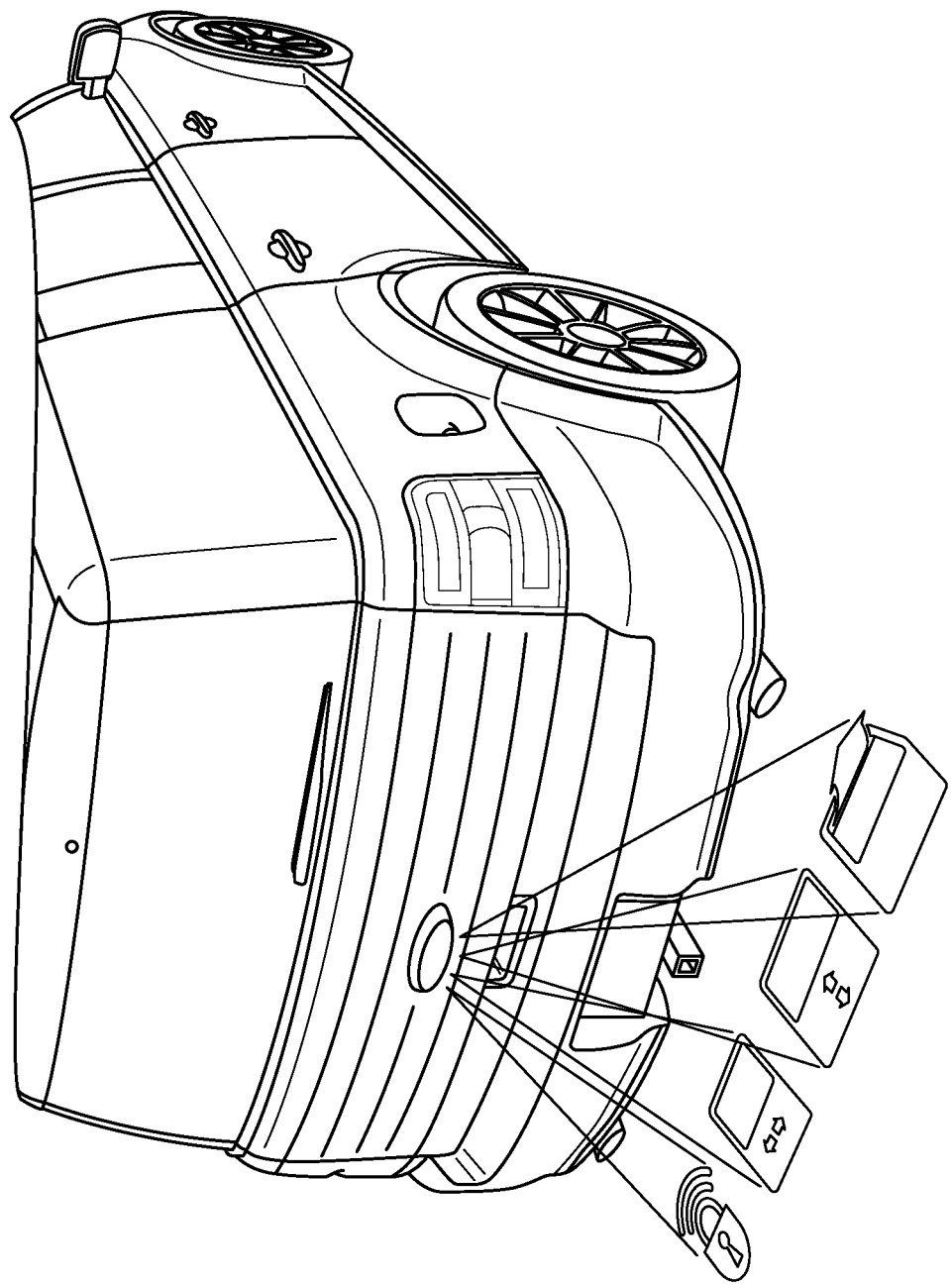
FIG. 1 is a perspective view of a vehicle equipped with a projection light module in accordance with aspects of the present invention, which projects icons onto the ground by the vehicle, whereby a user may actuate a vehicle function by stepping at or on a respective one of the icons.
Figure 2:
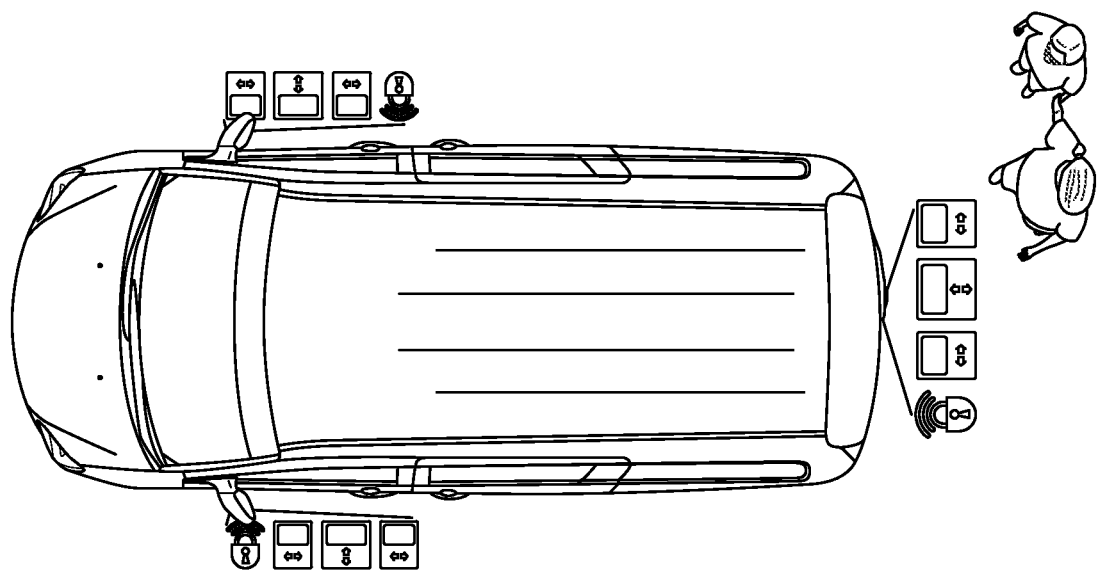
FIGS. 2-7 are top plan views of a vehicle equipped with a projection light module and sensing system in accordance with aspects of the present invention, showing how a user may open and close a door of the vehicle in accordance with the present invention.

Referring now to the drawings and the illustrative embodiments depicted therein, projecting and sensing module may be disposed at a vehicle (such as at the lift gate or rear portion of the vehicle and/or at a side portion of the vehicle, such as at an exterior rearview mirror assembly or the like at a side and exterior portion of the vehicle, with the projecting and sensing module being operable to project a plurality of icons onto the ground (or portion of the vehicle) and being operable to sense an approach of a user's hand or foot at the respective icons. Responsive to such a sensing or determination, the projecting and sensing module generates a signal to control an accessory or function represented by the respective icon. For example, if one of the icons represents a side sliding door of the vehicle, the system and projecting and sensing module may determine when a person's foot is at that icon and, responsive to such a determination, the system may open (or close) the side sliding door of the vehicle. The illumination module may utilize aspects of the illumination module described in U.S. Pat. No. 8,801,245 and/or U.S. patent application Ser. No. 14/615,821, filed Feb. 6, 2015 and published Aug. 13, 2015 as U.S. Publication No. US-2015-0224919, which are hereby incorporated herein by reference in their entireties.

The projecting module may include or may be associated with a sensor or sensing device that is operable to sense or detect the presence of a user (or foot of a user) at one or more icons projected by the module, whereby, responsive to detection of the user at the icon, the vehicle may actuate one or more vehicle functions or accessories or systems (such as a door unlock function or a door or lift gate open function or the like). For example, and with reference to FIG. 1, a vehicle may include an illumination module (such as at the rear door or lift gate of the vehicle, and/or at the side exterior mirrors or side doors of the vehicle) that is operable to project a plurality of icons onto the ground or vehicle surface at the rear (or side) of the vehicle. The icons are representative of a particular vehicle function. In the illustrated embodiment, for example, the icons indicate a door lock/unlock function, a door open/close function (such as for a side sliding door or the like), a second door open/close function (such as a rear lift gate open/close function) and a window open/close function (such as for opening a window of a side door of the vehicle or opening the glass window portion of a two part rear lift gate or tail gate or the like). A sensor or sensing device, such as an infrared sensor, a laser sensor or a camera or the like, is operable to determine when a user steps or moves in a manner so as to select one of the projected icons, and responsive to such detection, the control system is operable to actuate that selected/detected function. The sensors and control may comprise any suitable sensing means, and may determine the presence or movement of the user at or near the icons, such as via a capacitive sensor or proximity sensor and/or motion control system and/or gesture control system.

For example, and with further reference to FIGS. 2-7, a vehicle equipped with an illumination and sensing and control system of the present invention may, responsive to determination that a user of the vehicle is approaching the vehicle (such as in response to a passive entry system or keyless entry system detecting a passive entry device or fob carried by the user), actuate the illumination modules (shown at the side mirrors and at the rear door of the vehicle) to project the icons onto the ground at the sides and rear of the vehicle (FIG. 2) or optionally onto a vehicle surface (such as a vehicle panel or vehicle bumper or the like). Optionally, all of the illumination modules may be activated to project the icons or only the illumination module or modules that are closest to the detected user may be activated to project the icons. In the illustrated embodiment, the projected icons are associated with a door lock/unlock function, a driver side slider door open/close function, a passenger side slider door open/close function and a rear lift gate open/close function (although other functions may be provided by a projection light and sensing system of the present invention).

Figure 3:
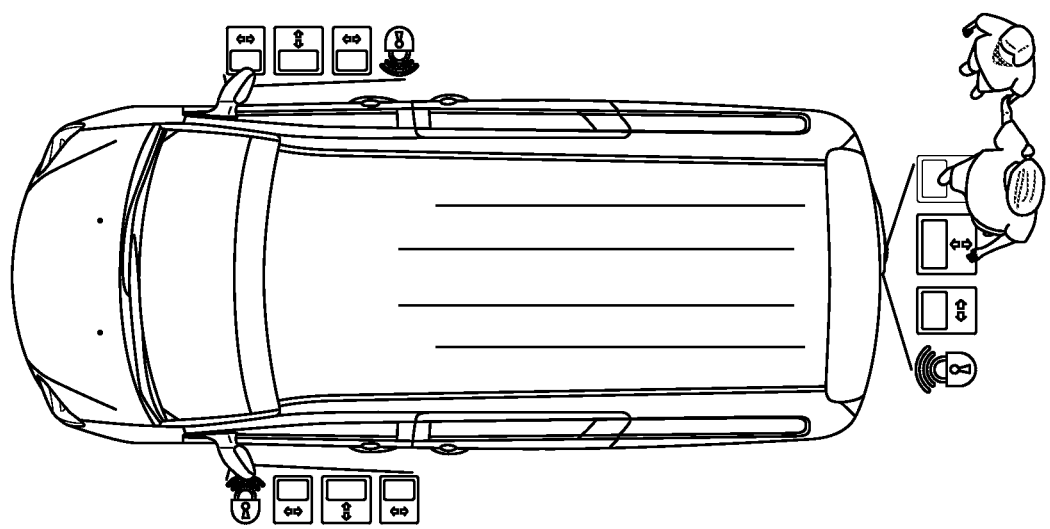
Figure 4:
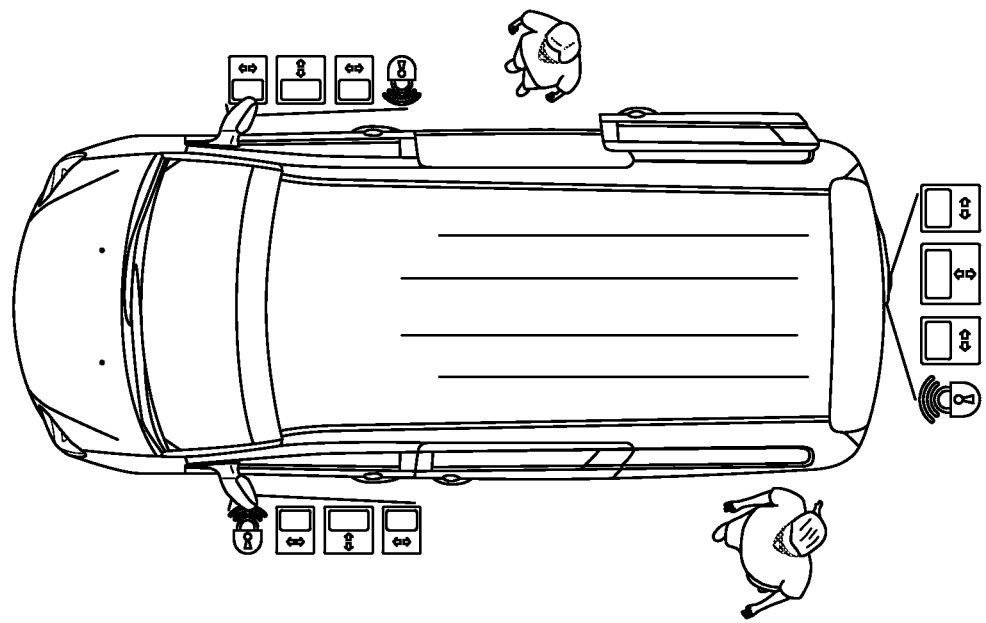

The user may step or move in a manner so as to select one of the icons, such as, for example, the side slider door open icon (FIG. 3). Responsive to the sensor sensing the presence of the user's foot at the ground at the location where the projected icon is projected towards or onto (so as to select the icon and activate the associated function), the illumination module may optionally change the color of that icon to visually confirm to the user that the system recognized actuation by the user of that function. As shown in FIG. 4, the system then performs the selected function, such as opening the passenger side slider door.

Figure 5:
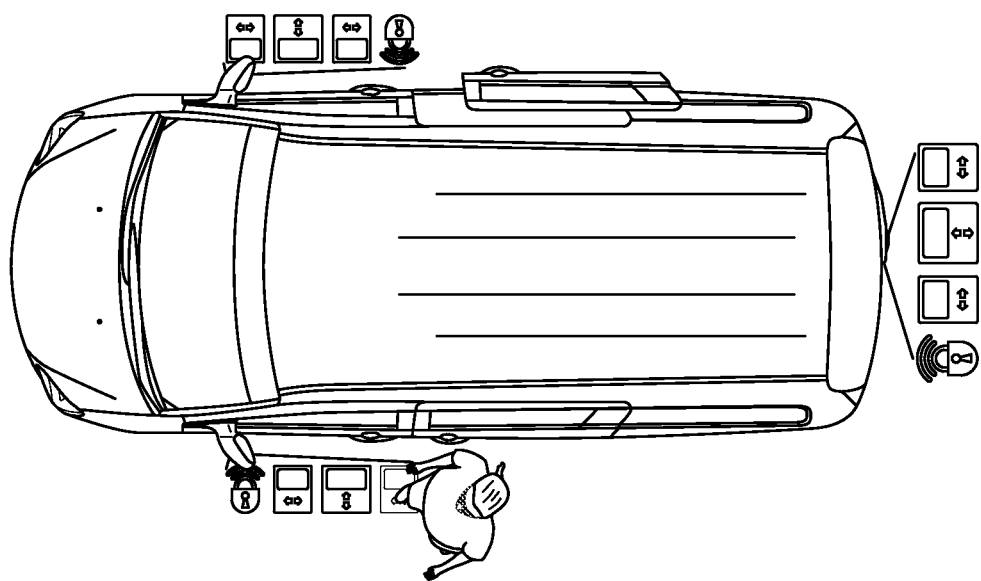
Figure 6:
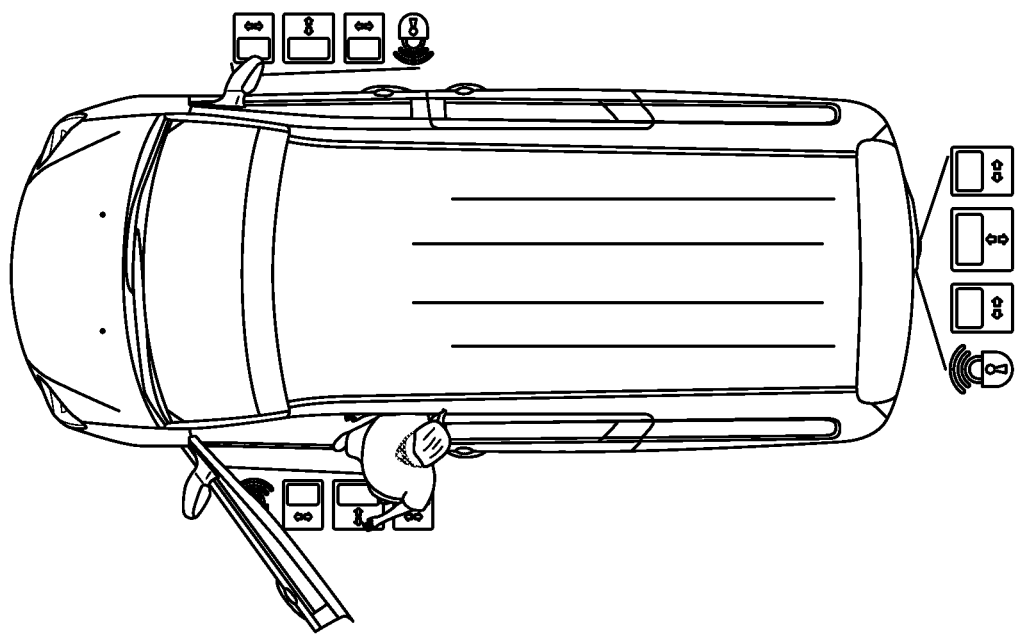
Figure 7:
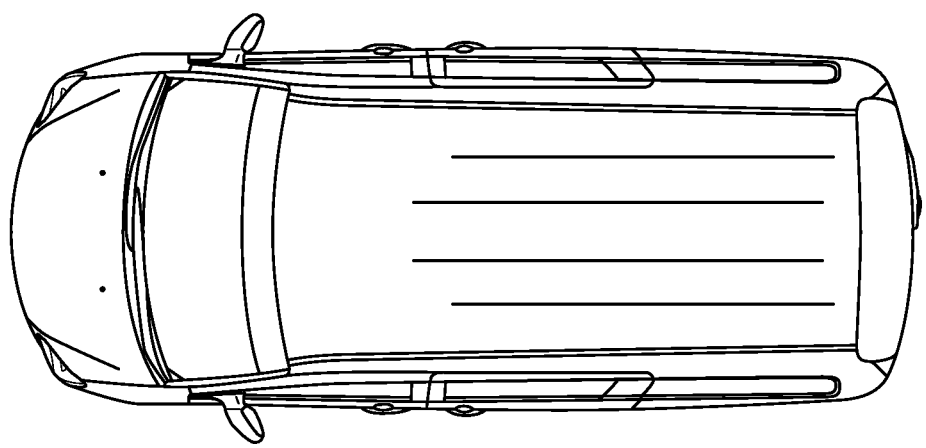

The user (in this example, the eventual driver of the vehicle) may (after actuating the side door via stepping on the icon) walk around the vehicle to the driver-side door, where the icons are also projected onto the ground or vehicle surface, and may step or move in a manner so as to select the passenger side slider door open/close icon to cause the passenger side slider door to close (FIG. 5). Again, the selected icon may change color or may flash or the like to confirm to the user that the selection was recognized by the system. The user may then enter the vehicle (such as shown in FIG. 6 and such as via manually opening the driver door or via an icon that controls that function) and the system may deactivate the illumination module and sensing system (FIG. 7), such as responsive to the driver entering the vehicle or closing the driver door or starting the vehicle or the like. If the user had initially approached the driver side door in this example, the user may have stepped on or otherwise selected the passenger side slider door icon a first time to open the passenger side slider door and, after the other person got into the vehicle through the passenger side slider door, the user may have stepped on or otherwise selected the passenger side slider door icon a second time to close the passenger side slider door.

In the illustrated embodiment, the illumination or projecting and sensing module is operable to project the plurality of icons onto the ground area at or near the rear and/or sides of the vehicle. The sensing device thus may sense the presence of a user's foot at or near the ground area onto which a particular icon is projected. Optionally, the module may be operable to project the icons onto a panel or portion of the vehicle. For example, the module may project the icons onto a panel of the vehicle or onto the rear bumper of the vehicle (for a rear or lift gate mounted module). Optionally, the icons may be projected onto a reflective sheet or material (optionally under a clear coat layer or the like) to enhance visibility and viewability of the icons, such as during daytime lighting conditions. For example, the icons may be viewable at a reflective sheet at the upper surface of the vehicle bumper (or other strategic location at or on or around the vehicle) and the sensing device may determine when a user's foot is moved to a location at or near the ground below a particular one of the displayed or projected icons at the bumper. Thus, the system may show icons reflected at vehicle surfaces with the activation points or locations at or near the ground.

An exemplary illumination and sensing and control system of the present invention thus provides user actuatable inputs at the ground at or near the side/rear of the vehicle. The icons may be projected responsive to a determination by the vehicle system (such as a passive entry system or vision system or the like) that a user (who is recognized by the passive entry system) is approaching the vehicle. The user may then actuate a desired function by stepping (or otherwise moving a foot or hand) at or on or in a manner that selects the appropriate projected icon. The sensor is operable to detect the location of the user's foot at or near the icons (such as by determining when particular infrared signals or beams or portions of infrared signals or beams or the like is/are interrupted at or near the ground level) to determine which icon was selected by the user, and may generate a control signal or output accordingly, whereby the selected function is performed. The system optionally, and desirably, generates a confirmation signal to the user (such as by a change in the color or intensity or size of the selected icon or by flashing the selected icon or by an audible signal or the like) to confirm to the user that the selection was made and recognized by the system.

The present invention thus combines a projection light with an infrared sensor or camera (or other suitable sensor) to provide the driver or user the ability to select and perform certain functions from outside of the vehicle, without having to use their hands (thus providing hands-free opening/closing of the vehicle doors and/or locking/unlocking of the vehicle doors and/or the like). The projection light module may be disposed at the exterior mirror assemblies or at the lift gate handle or elsewhere at the sides and rear of the vehicle. The sensors may be similarly disposed at the exterior mirror assemblies or at the lift gate handle or elsewhere at the sides and rear of the vehicle (such as at the vehicle frame or the like). The vehicle functions can thus be activated or controlled simply by a user (a recognized or authorized user) stepping on or otherwise stepping or moving in a manner that selects one or more of the icons projected at the ground (or vehicle surface) at the side(s) and/or rear of the vehicle.

Optionally, the icons may be projected/illuminated only when the key fob is determined to be close enough to the respective door or icon, so that if the user were at the driver side door, the driver side icons would be projected at the ground by the vehicle (or at the vehicle surface) and the passenger side icons would not be activated or projected or illuminated. Optionally, the icons may be otherwise projected at the side or rear of the vehicle, such as onto the door panel of the vehicle or the like, whereby the user may touch a desired projected icon to select the desired function. Other projection of icons may be provided while remaining within the spirit and scope of the present invention.

For example, the controller of the projecting and sensing system may be coupled to or in communication with a vehicle control (such as a vehicle ECU or body control module or the like), and may be linked to or responsive to an authentication system, such as a passive entry system or remote keyless entry system or the like. When activated, such as in response to the vehicle control and passive or keyless entry system (such as when the vehicle system determines the presence or approach or activation of a key fob or the like), the icons are projected onto the ground or vehicle surface or portion and the sensor or sensors is/are operable to detect the presence or proximity of the user at a selected one of the icons. The sensors may comprise a capacitive sensor or other suitable proximity sensing device, whereby, when the user's foot enters a region or area above a respective icon, the presence of the user's foot effects the electric field generated by an electrode of the sensor or sensor portion associated with that icon, which results in a change in capacitance between the two electrodes of that sensor, whereby the system may determine the icon at which the user has selected and positioned their foot at or near, such as by determining which sensor of the sensing module has the greatest change in capacitance. The sensors and control may utilize aspects of the sensors described in U.S. Pat. No. 8,154,418, and/or International Publication Nos. WO 2011/044312; WO 2012/051500 and/or WO 2013/071070, which are hereby incorporated herein by reference in their entireties A projecting and sensing module in accordance with aspects of the present invention may comprise a self-contained unitary module disposed at the lift gate and/or exterior rearview mirror assemblies of the vehicle, whereby the icons are projected downwardly onto the ground (or vehicle surface) at or near the lift gate and/or side doors of the vehicle. The module may include a control or control circuitry that is operable to control the projector or projectors that project the icons and to control the sensors that sense the presence of the user at or near the icons. The control circuitry may be operable to communicate with a body control module to control a door actuator and/or a lock actuator and/or a window control of the vehicle, responsive to a determination of a user's foot at or near a particular projected icon.

Figure 8:
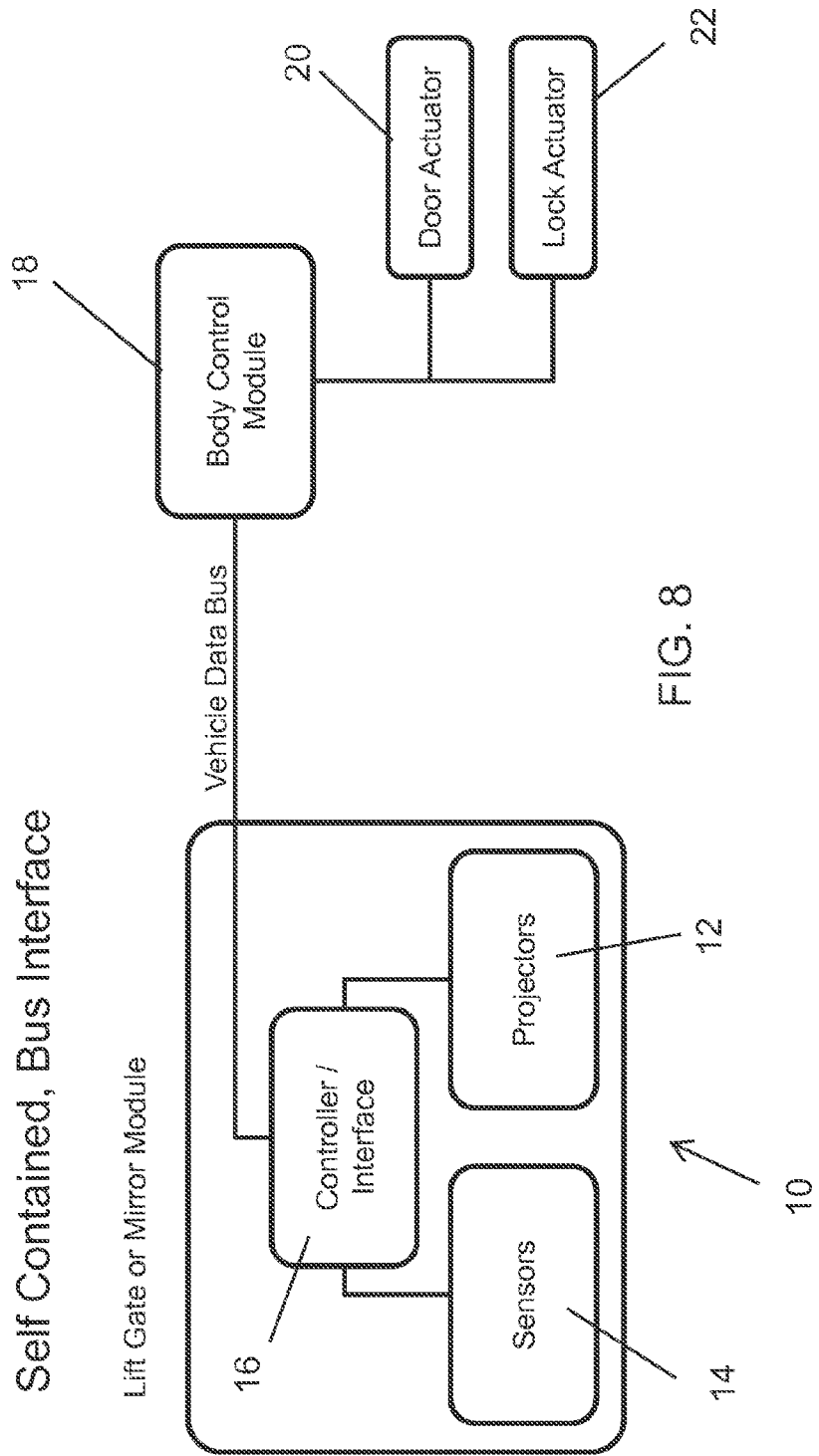
FIG. 8 is a schematic of a system utilizing a sensing and projecting module in accordance with aspects of the present invention in communication with a body control module.
Figure 11:
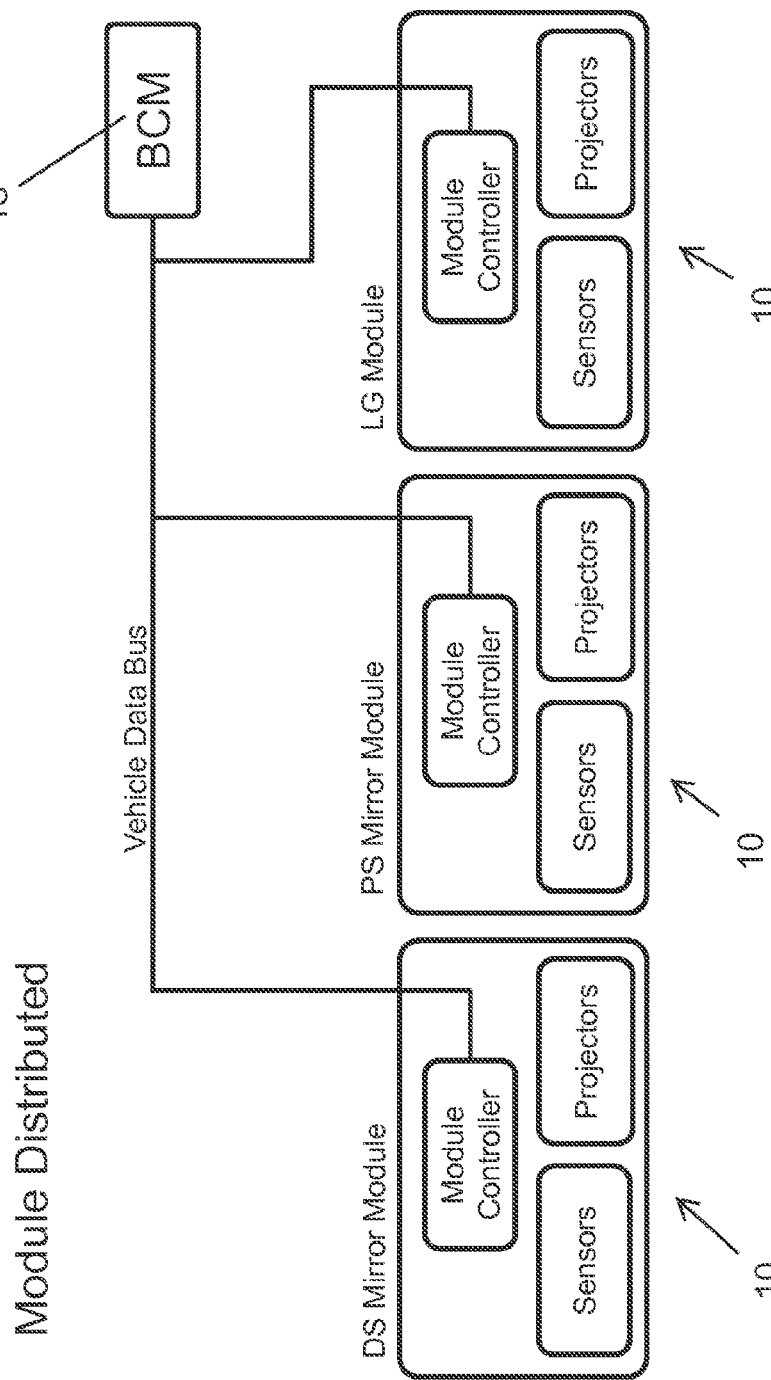
FIG. 11 is a schematic of a system utilizing a plurality of sensing and projecting modules in accordance with aspects of the present invention in communication with a body control module.

For example, and with reference to FIG. 8, a self-contained sensing and projecting module 10 (such as for use at a lift gate or exterior mirror) includes projectors 12 and sensors 14 and a controller 16, which is operable to communicate with a body control module 18 of the vehicle (such as via a vehicle data bus or the like). The body control module is in communication with a door actuator 20 and a lock actuator 22. Thus, responsive to a remote keyless entry function or unlocking of the vehicle door or the like, the body control module may determine that the user is at or approaching the vehicle and may generate a signal to the controller, which may activate the projectors at the side mirror or mirrors or lift gate of the vehicle. The controller then processes data or signals from the sensors and determines when a user's foot is at a particular projected icon, and generates an appropriate output signal to communicate to the body control module to control the appropriate or selected accessory or function. For example, responsive to an output signal from the controller that is indicative of a determination of a user's foot at a door open/close icon, the body control module controls the door actuator to open or close that door. As shown in FIG. 11, multiple sensing and projecting modules 10 (such as a driver side mirror module, a passenger side mirror module and a lift gate module) may be disposed at the vehicle and linked to the body control module 18, such as via the vehicle data bus or the like.

Figure 9:
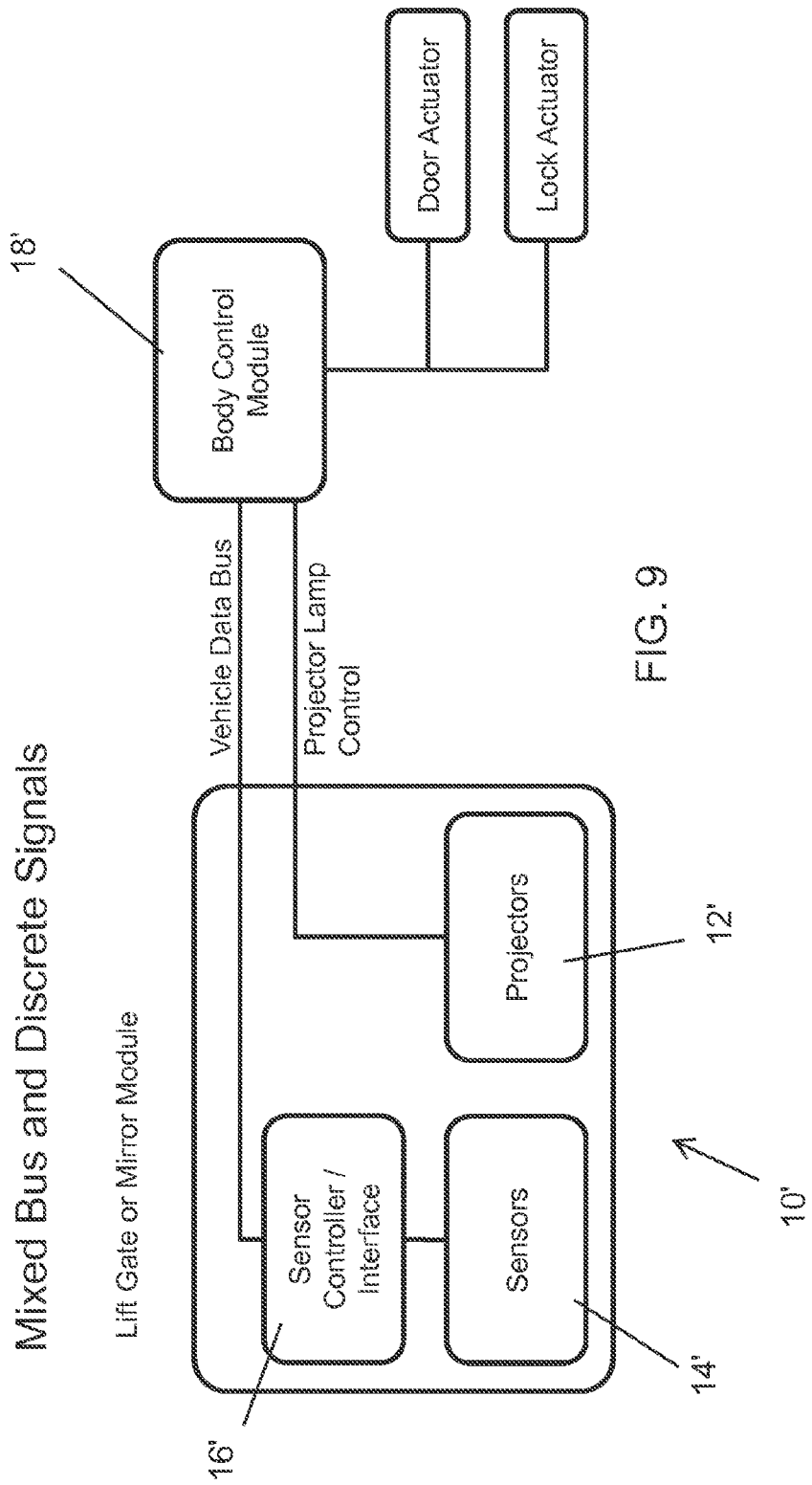
FIG. 9 is a schematic of a system utilizing another sensing and projecting module in accordance with aspects of the present invention in communication with a body control module.

Optionally, and such as shown in FIG. 9, the controller 16' of a module 10' in accordance with aspects of the present invention may communicate with the sensors 14' and with the body control module 18', while the body control module 18' generates a projector lamp control signal directly to the projectors 12'. Thus, responsive to an input indicative of a user at the vehicle, the body control module may activate the projectors of the module. Then, the sensor controller 16' may process the sensor outputs to determine when a user's foot is at or near a particular one of the projected icons and generate an appropriate output signal. Responsive to the signals from the controller 16' of the module 10', the body control module 18' controls or generates signals to control or open/close the appropriate or selected accessory or function.

Figure 10:
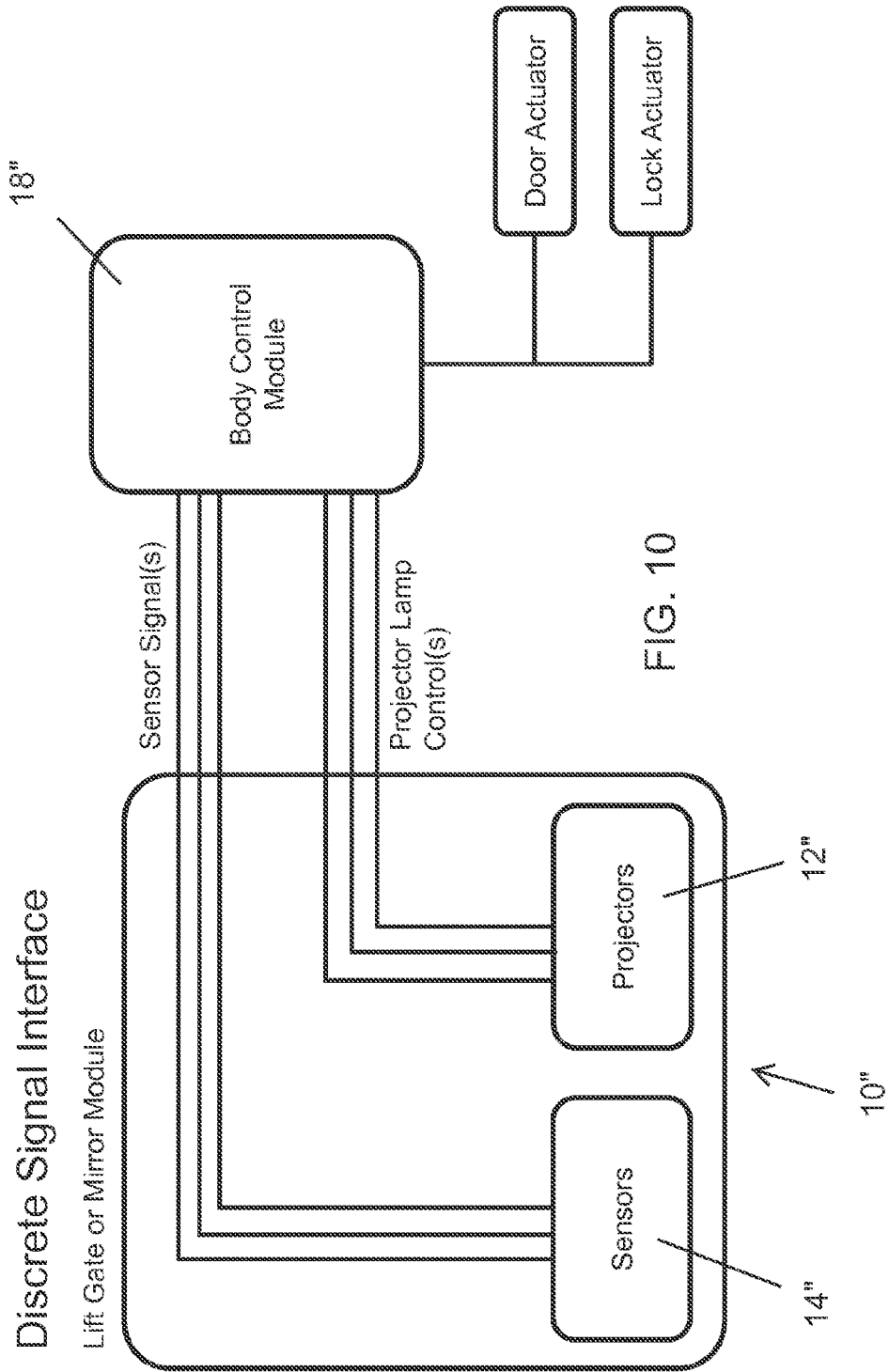
FIG. 10 is a schematic of a system utilizing another sensing and projecting module in accordance with aspects of the present invention in communication with a body control module.

Optionally, and such as shown in FIG. 10, a projecting and sensing lift gate/mirror module 10" may not include a controller, whereby the sensor 14" and the projectors 12" communicate directly with the body control module 18". Thus, the body control module determines when a user is present at the vehicle and actuates the projectors and the body control module receives data or output signals from the sensors and processes the data or signals to determine if a user's foot is present at or near one of the projected icons, whereby the body control module may control or open/close the appropriate or selected accessory or function.

Figure 12:
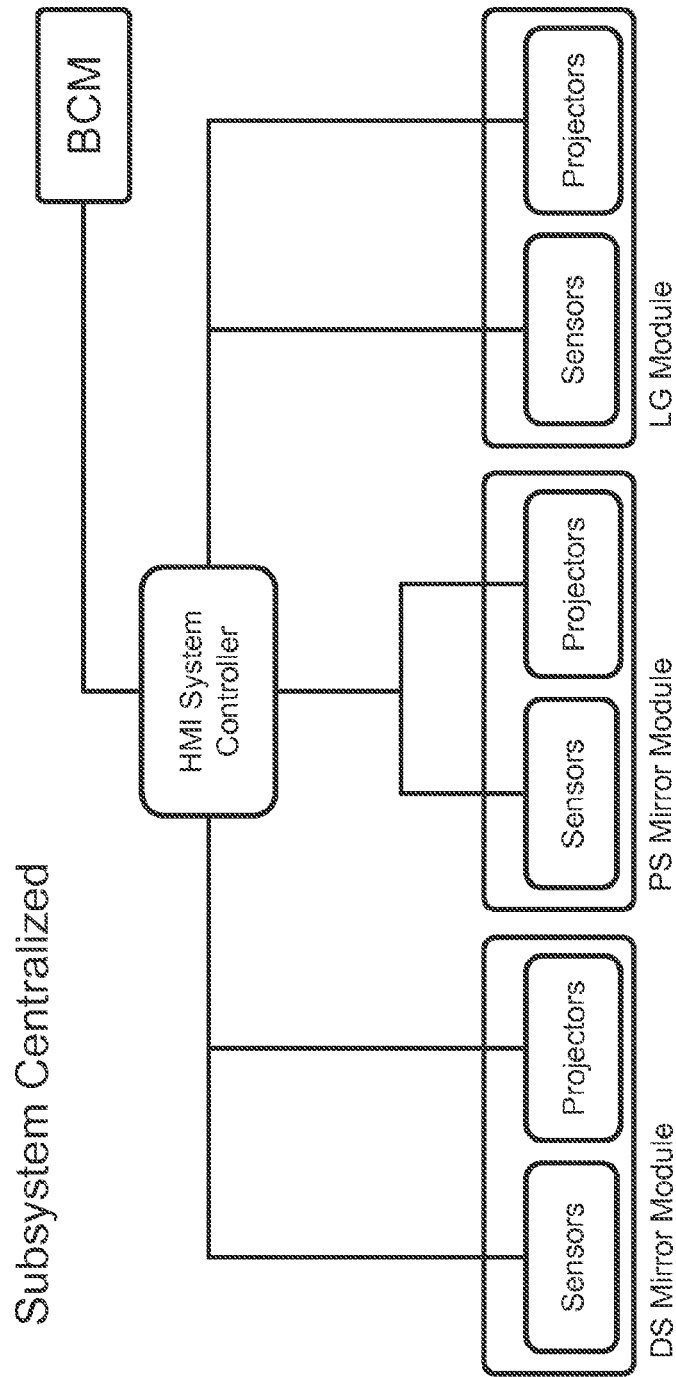
FIG. 12 is a schematic of a system utilizing a plurality of sensing and projecting modules in accordance with aspects of the present invention in communication with a human-machine interface (HMI) system controller, which communicates with a body control module.

Optionally, and such as shown in FIG. 12, multiple sensing and projecting modules (such as a driver side mirror module, a passenger side mirror module and a lift gate module) may be disposed at the vehicle and linked to the body control module, such as via an HMI system controller. The modules may link to the HMI system controller via the vehicle data bus or the like and/or the HMI system controller may link to the body control module via the vehicle data bus or the like. The HMI system controller may process the signals from the body control module for control of the projectors and may process the signals from the sensors for communication to the body control module for control of the selected accessory or function.

Figure 13:
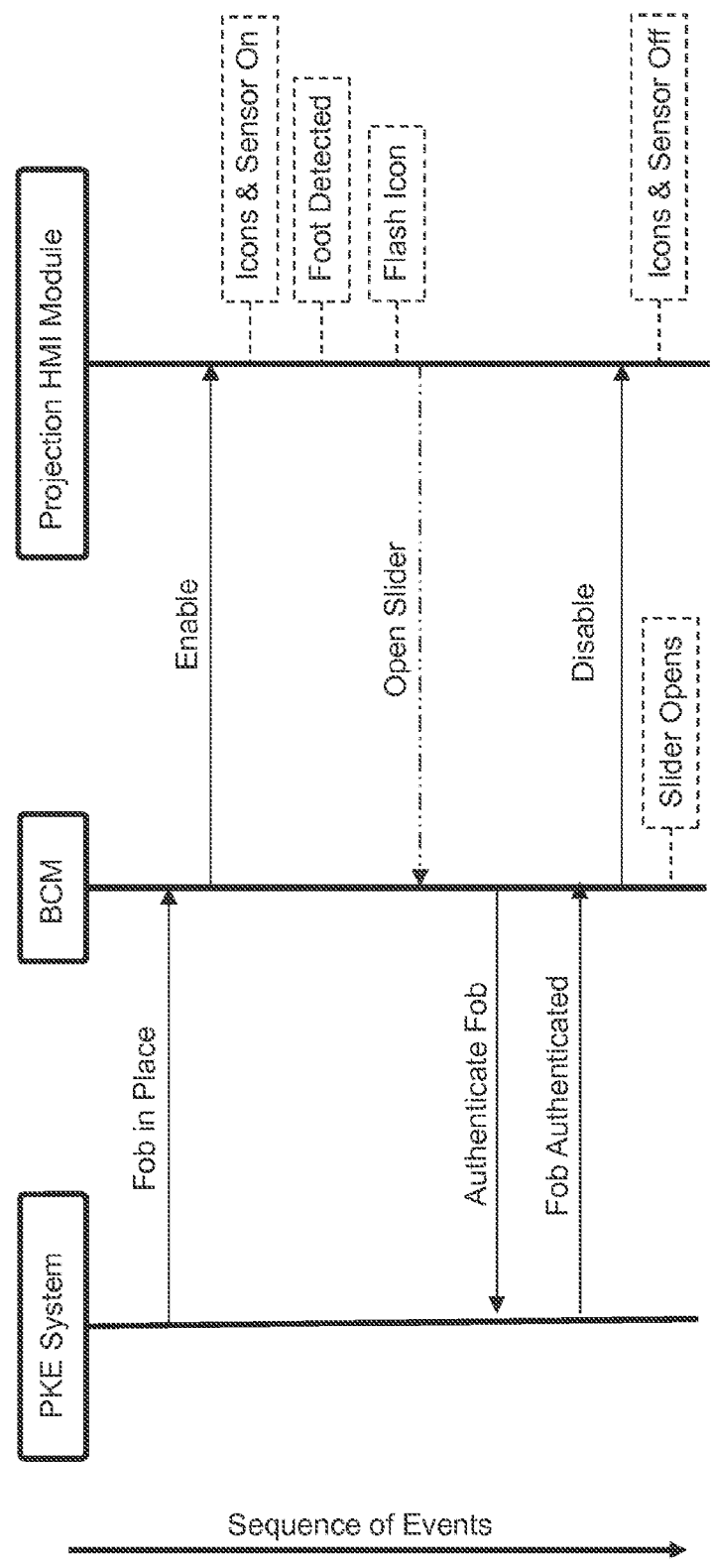
FIG. 13 is a flow chart showing the sequence of events during operation of a sensing and projecting module in accordance with aspects of the present invention, shown with feedback control provided in the module.

Thus, a module and system in accordance with aspects of the present invention provides for projection of multiple icons (each indicating or associated with a particular vehicle function) when the system determines that a user is present at or approaching the vehicle, and the module or system may then determine when the user's foot is at or near a particular icon and may then actuate or control the accessory or function associated with that icon. For example, and such as shown in FIG. 13, a human machine interface (HMI) feedback control may be provided in the module. As shown in FIG. 13, the passive entry system or keyless entry system of the vehicle may determine that a user is at or approaching the vehicle (such as via detection of a key fob or the like) and may generate a signal that is received by the body control module of the vehicle. Responsive to such a signal, the body control module communicates to the projection HMI module or projecting and sensing module that the module is to be enabled, whereby the module activates the icons and sensor. When the user's foot is detected at or near a particular icon (such as, for example, a slider door open/close icon), the module flashes the projected icon and generates a signal to the body control module to open the slider door. The body control module may then communicate with the passive entry or remote keyless entry system to authenticate the fob (to verify that the user is authorized to open the vehicle door), whereby, responsive to such authentication, the module is disabled (i.e., the icons and sensors are deactivated) and the slider door is opened by the body control module.

Figure 14:
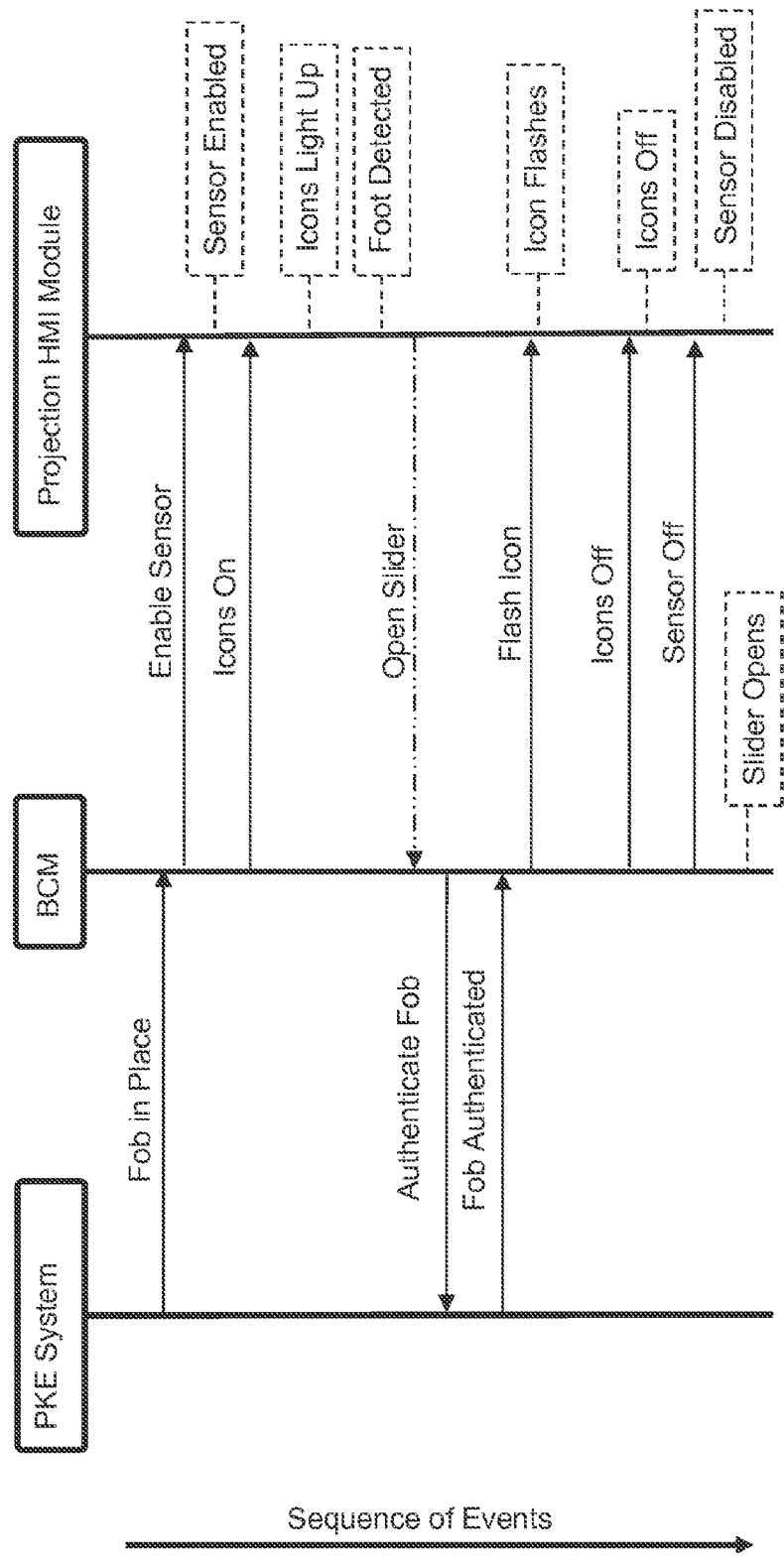
FIG. 14 is a flow chart showing the sequence of events during operation of a sensing and projecting module in accordance with aspects of the present invention, shown with feedback control provided in the body control module.
Figure 15:
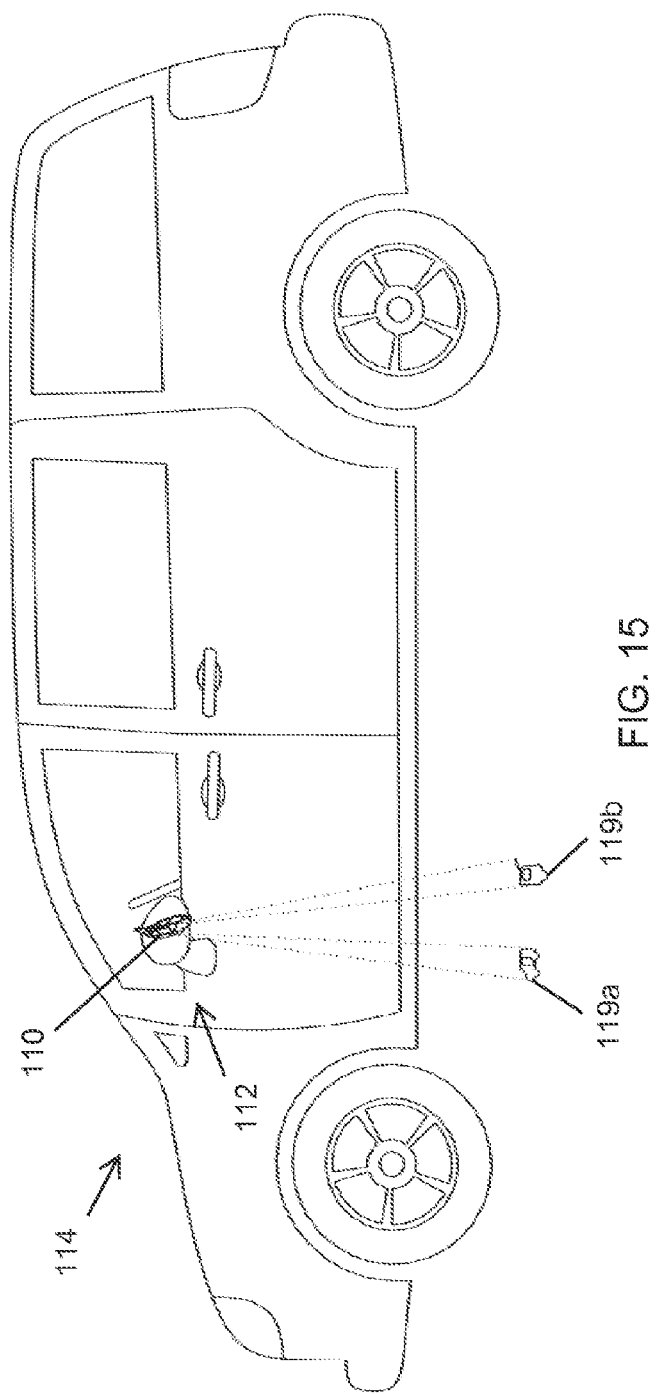
FIG. 15 is a side elevation of a vehicle equipped with a projection light module in accordance with aspects of the present invention.
Figure 16:
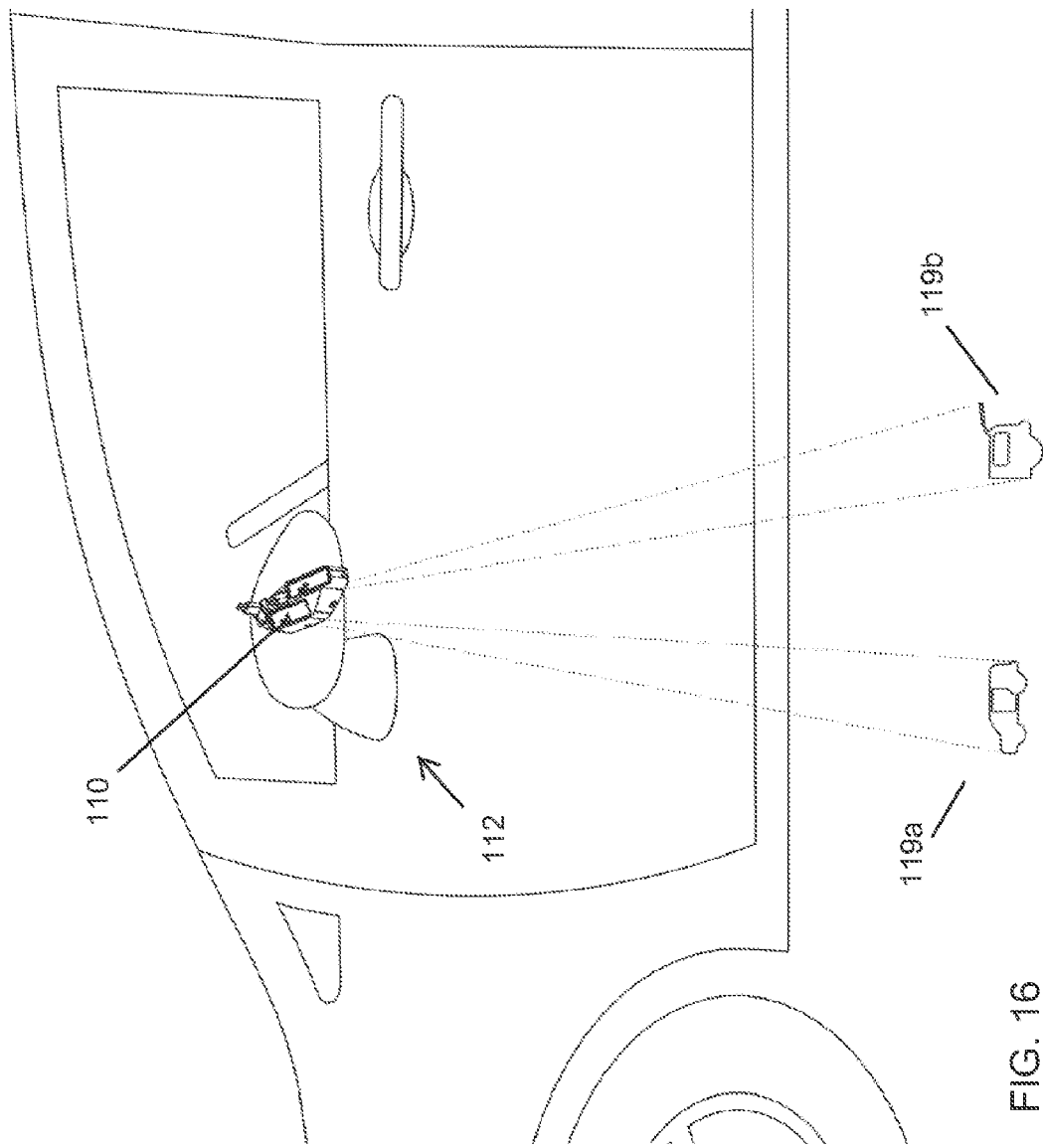
FIG. 16 is an enlarged side elevation of the side of the vehicle of FIG. 15.

Optionally, a feedback control function may be provided in the body control module. For example, and with reference to FIG. 14, the passive entry system or keyless entry system of the vehicle may determine that a user is at or approaching the vehicle (such as via detection of a key fob or the like) and may generate a signal that is received by the body control module of the vehicle. Responsive to such a signal, the body control module communicates to the projection HMI module or projecting and sensing module that the module is to be enabled, whereby the module is enabled. The body control module then communicates a signal to the module to activate the icons, which are then activated. The module then operates to determine or sense the presence of a user's foot at one of the projected icons. When the user's foot is detected at or near a particular icon (such as, for example, a slider door open/close icon), the module generates a signal to the body control module to open the slider door. The body control module may then communicate with the passive entry or remote keyless entry system to authenticate the fob (to verify that the user is authorized to open the vehicle door), whereby, responsive to such authentication, the body control module sends a control signal to the projection module to flash the icon, whereby icon is flashed by the projection module, and then the body control module sends a control signal to the projection module to deactivate the icons, whereby the icons are turned off, and then the body control module sends a control signal to the projection module to deactivate the sensor, whereby the sensor is disabled. The slider door is then opened by the body control module. Although shown and described as sequential actions, the flashing of the icon, deactivation of the icons, deactivation of the sensor and opening of the slider (or other control function) may be performed simultaneously or in any order.

Thus, an exemplary embodiment of the present invention provides at least one and preferably three projecting and sensing modules (such as at the vehicle lift gate and exterior mirrors), with each module being operable to project a plurality of icons onto a ground area or vehicle portion, such as responsive to a key fob or passive entry system of the vehicle or the like. The modules or system may determine when a user's foot is placed at or near one of the projected icons and may activate or deactivate or control the accessory or function associated with that particular icon. The system may include security measures to authenticate the fob detection before opening a door or window of the vehicle.

Optionally, a projection module in accordance with aspects of the present invention may be operable to reconfigure the icons projected onto the ground or vehicle panel, such as to show the current state of the accessory or function associated with the particular icon. For example, an icon representative of a door lock function may comprise a lock icon or figure that is projected in a locked state when the vehicle doors are locked and may be reconfigured to be projected in an unlocked state when the vehicle doors are unlocked. The reconfiguration of the projected icons may be performed via any suitable means, such as selective projection of two or more icons for each function or accessory. For example, a "door locked" icon may be backlit when the vehicle doors are locked and a separate "door unlocked" icon may be backlit when the vehicle doors are unlocked. The associated icons may be projected onto the same area, such that switching from one to the other does not change the location of the projected icon, but changes the appearance of the icon at that location. Optionally, the same icon may be backlit by a different colored light depending on the status of the associated function or accessory (e.g., a red icon for a locked condition and a green icon for an unlocked condition). Optionally, the icon itself may be reconfigurable to provide the desired projected icon appearance when backlit by the respective illumination source.

Figure 17:
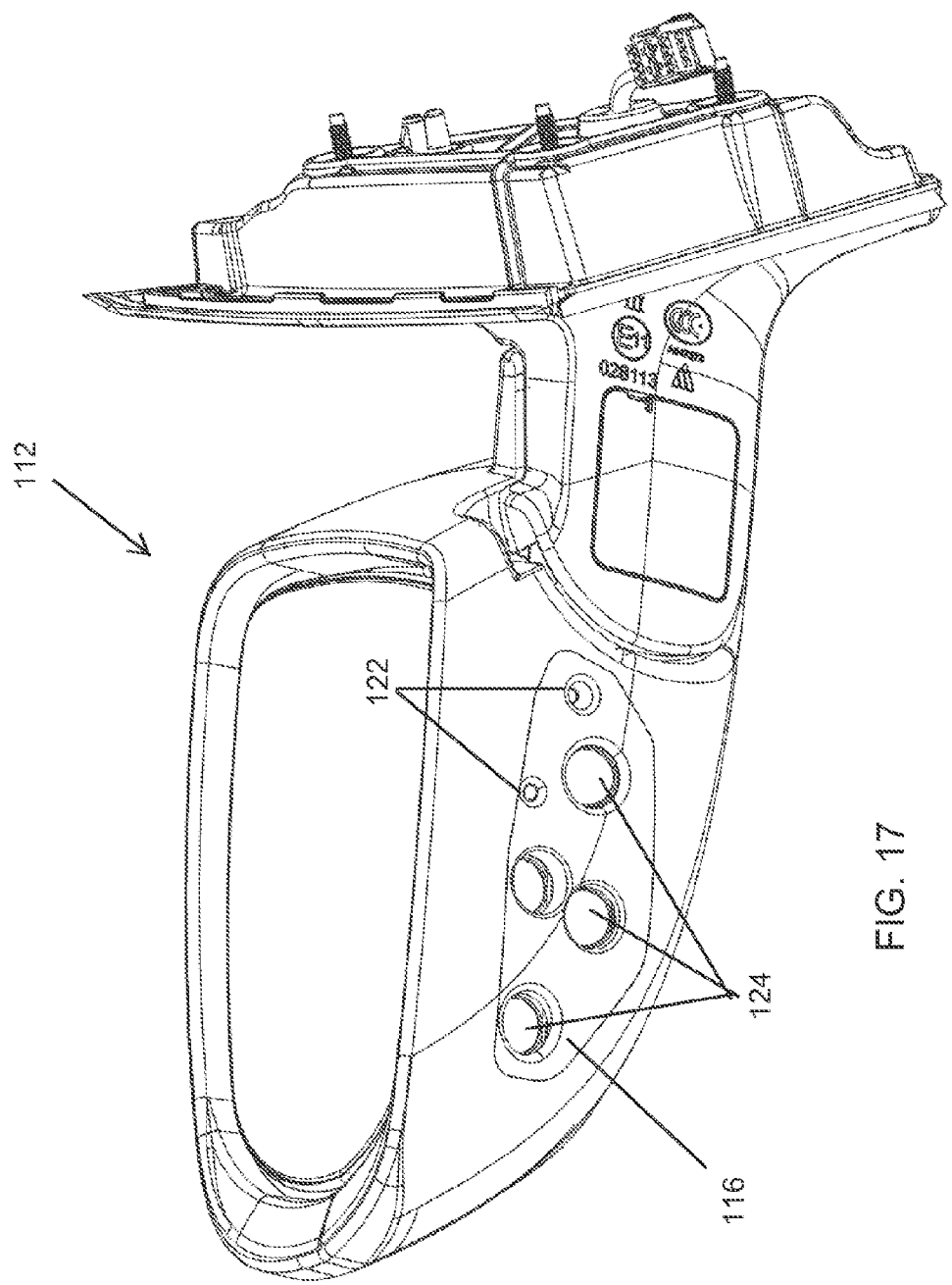
FIG. 17 is a perspective view of an exterior rearview mirror assembly, with a projecting light module of the present invention, shown with two sensors and two projection lights.
Figure 18:
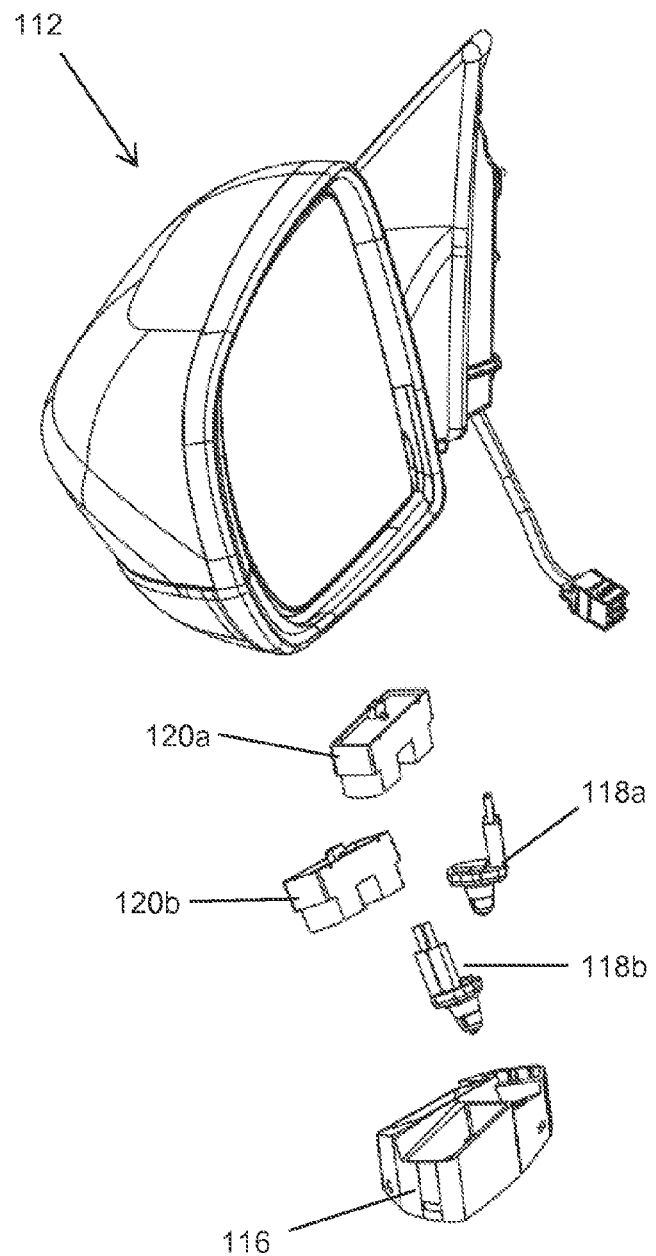
FIG. 18 is an exploded perspective view of the exterior rearview mirror assembly of FIG. 17.

Thus, a projection and sensing module in accordance with aspects of the present invention may be disposed at or in an exterior rearview mirror of a vehicle and may include two or more projectors or projection devices and at least one sensor that is operable to sense the presence of a person's foot at or near one of the projected icons at or near the ground. For example, and with reference to FIGS. 15-18, a projection and sensing module 110 is disposed at a driver-side exterior rearview mirror assembly 112 of a vehicle 114. As shown in FIG. 17, the module may be received in a lower portion of the mirror assembly, with a lower surface of the module generally matching the contours of the lower portion of the mirror casing. As best shown in FIG. 18, the module 110 includes a housing or enclosure 116, which houses or supports two projection devices 118a, 118b and two sensing devices 120a, 120b (and optionally the module may include more sensing devices and more projection devices depending on the particular application of the module).

In the illustrated embodiment, the projection devices 118a, 118b of the module 110 are operable to project respective icons 119a, 119b generally downward through apertures 122 of the housing and towards the ground at the side of the vehicle, with one icon 119a representing the side slider door of the vehicle and the other icon 119b representing the rear lift gate of the vehicle. The sensing devices 120a, 120b may comprise any suitable sensing device, such as a laser sensing device or time of flight (TOF) sensing device or the like, which has an emitting portion and a receiving portion, with the emitting and receiving portions disposed at respective apertures 124 at the housing. As can be seen with reference to FIG. 18, the projection devices and sensor devices are arranged and angled relative to one another so that each sensor is directed towards the icon projected by the respective projecting device (and not directed towards the other projected icon). Thus, during operation, the projection devices 118a, 118b, when activated, project the respective icons downward at the ground at the side of the vehicle and the sensors operate to determine when a person's foot is present at or near one of the projected icons, whereby, responsive to such a determination, an appropriate signal is generated to control the accessory or feature (such as opening/closing the side slider door or rear lift gate of the vehicle) associated with the icon at which the foot was detected.

Figure 19:
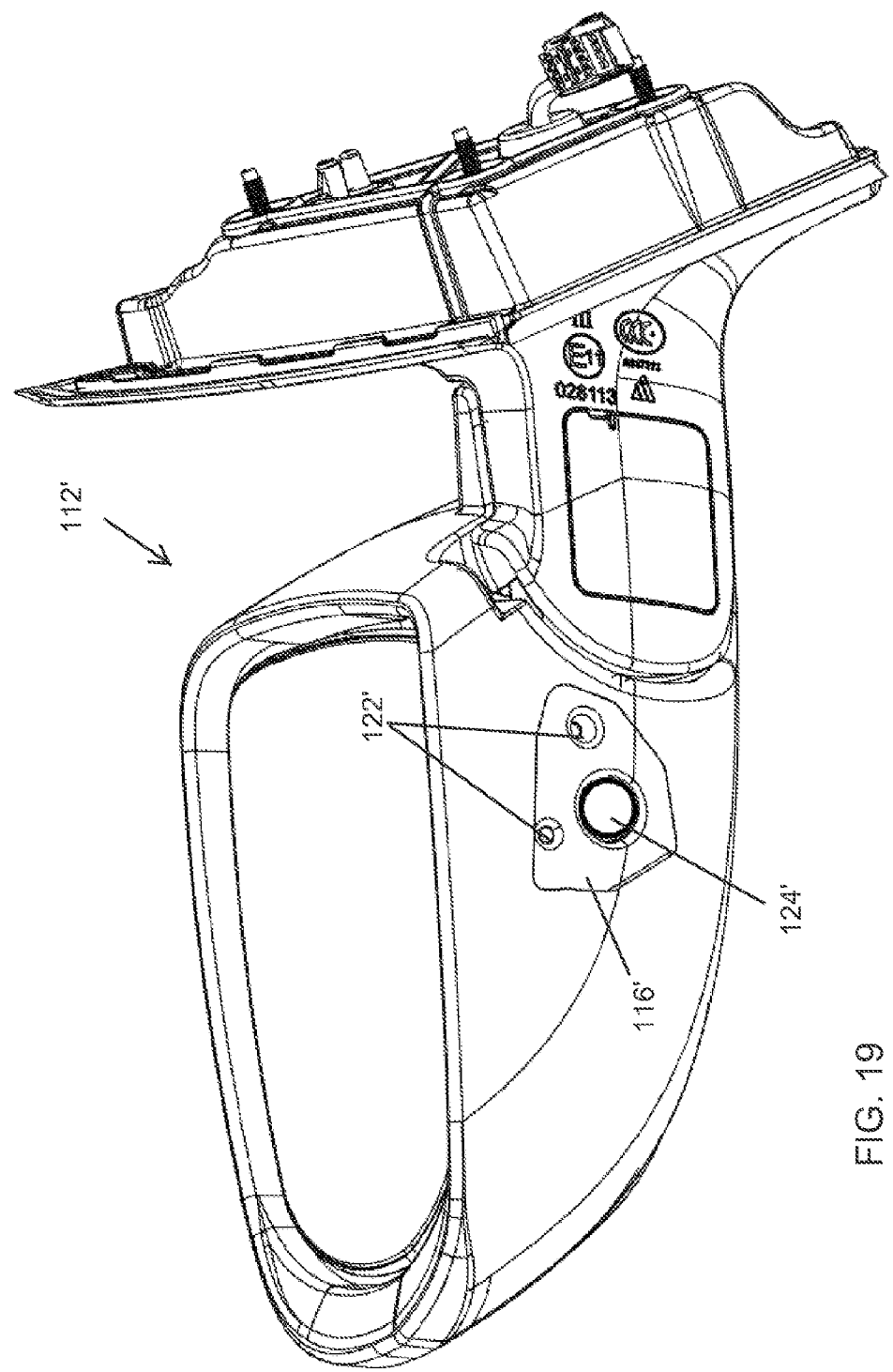
FIG. 19 is a perspective view of an exterior rearview mirror assembly, with a projecting light module of the present invention, shown with one camera or sensor and two projection lights.
Figure 20:
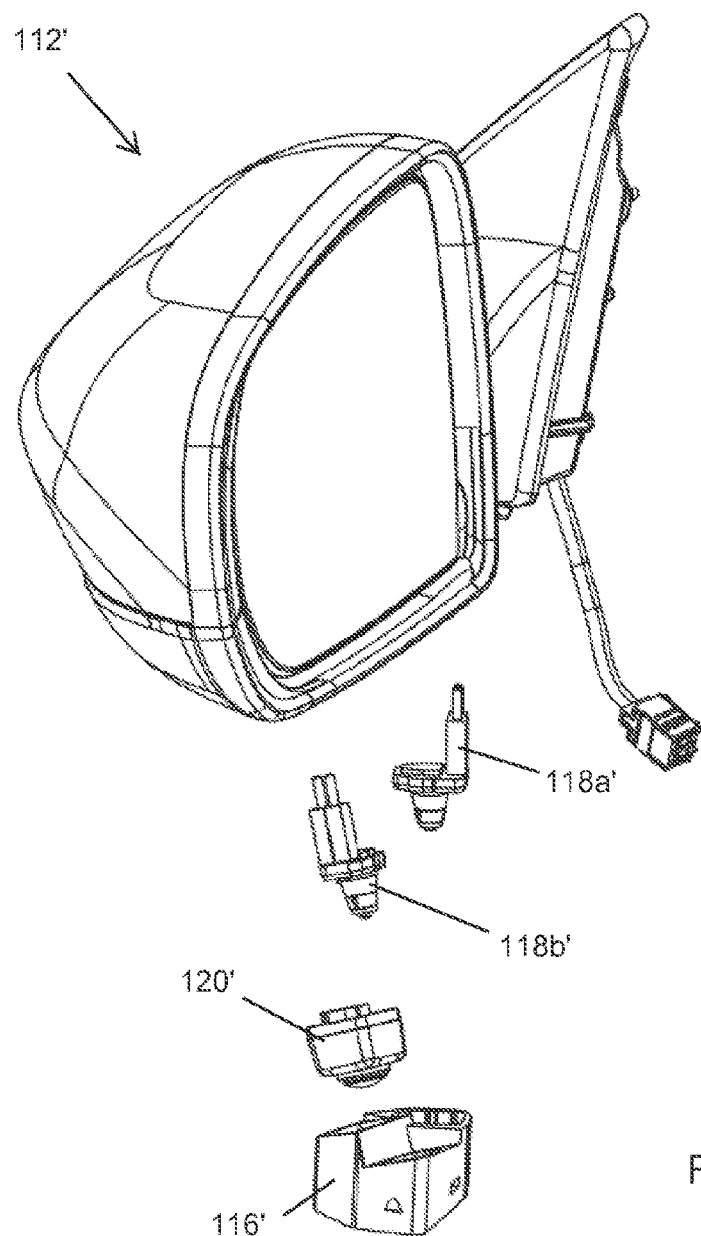
FIG. 20 is an exploded perspective view of the exterior rearview mirror assembly of FIG. 19.

Optionally, the projecting and sensing module may have a camera or image sensing device as its sensor, whereby only one sensor may be used to monitor and detect activity at two or more projected icon (such as via image processing of image data captured by the camera via an image processor of a control unit of the module or of the vehicle). For example, and with reference to FIGS. 19 and 20, a projection and sensing module 110' may be disposed at a driver-side exterior rearview mirror assembly 112' of a vehicle 114', with the module being received in a lower portion of the mirror assembly, with the lower surface of the module generally matching the contours of the lower portion of the mirror casing. As best shown in FIG. 20, the module 110' includes a housing or enclosure 116', which houses or supports two projection devices 118a', 118b' (and optionally the module may include more projection devices depending on the particular application of the module) and a single sensing device 120', which may comprise a single image-based sensing device or camera or the like.

In the illustrated embodiment, the projection devices 118a', 118b' of the module 110' are operable to project respective icons 119a', 119b' generally downward through apertures 122' of the housing and towards the ground at the side of the vehicle, with one icon 119a' representing the side slider door of the vehicle and the other icon 119b' representing the rear lift gate of the vehicle. The sensing device 120 is disposed at the housing and views through an aperture 124' at the housing, such that the field of view of the sensing device or camera encompasses the ground area at which the icons are projected. Thus, during operation, the projection devices 118a', 118b', when activated, project the respective icons downward at the ground at the side of the vehicle and the sensor or camera captures image data representative of the ground area and projected icons, whereby an image processor processes the captured image data to determine when a person's foot is present at or near one of the projected icons, whereby, responsive to such a determination, an appropriate signal is generated to control the accessory or feature (such as opening/closing the side slider door or rear lift gate of the vehicle) associated with the icon at which the foot was detected.

Optionally, the illumination module or modules (such as a module at the rear of the vehicle and a module at each side of the vehicle) may provide a dual function and is operable to provide a light projection function (such as projection of white or non-white light, such as a selected color or such as a variable color or the like to optionally coordinate with an interior color scheme of the vehicle or the like) with one (or more) light emitting diode (or other suitable light source) and a ground illumination function (such as via one or more white light-emitting light emitting diodes or other suitable light source). For example, the modules may utilize aspects of the illumination and projection light modules described in U.S. Pat. No. 8,801,245 and/or U.S. patent application Ser. No. 14/615,821, filed Feb. 6, 2015 and published Aug. 13, 2015 as U.S. Publication No. US-2015-0224919, which are hereby incorporated herein by reference in their entireties. The illumination module comprises a self-contained unitary sealed module with light emitting diodes and a lens/light guiding element to provide the desired illumination effect with the illumination source or illumination sources.

The illumination or projection and sensing module thus may comprise a small, self-contained module that includes a housing that substantially encases the illumination source and sensors and circuitry of the module. The housing and/or cover attached thereto includes an outer wall that may substantially correspond to the contours of the mirror assembly or door handle assembly or lift gate handle or trim at the module such that the outer vehicle surface has a substantially continuous outer surface or wall at the module. The module and housing may be substantially sealed so as to be substantially impervious to water, dirt, debris and the like, so that the module is well suited for the exterior application at the vehicle exterior rearview mirror or vehicle lift gate or the like.

As discussed above, the illumination module may include at least one illumination source or light source (such as a light emitting diode (LED) or electroluminescence light source or the like) that is operable to emit illumination, such as in response to a triggering or activating device or event. The light is projected through an icon mask or indicia so as to project the icon onto the ground or vehicle portion at which the light is directed. For example, the illumination source may be actuatable in response to at least one of a touch of the door handle, a movement of the strap or handle portion, actuation of a remote keyless entry module, or passive entry device, a motion detection at the vehicle, an insertion of a key into a keyhole at the door handle, and/or activation or deactivation or operation of a security system of the vehicle. Preferably, the illumination source is deactuatable following a period of time after actuation of the illumination source and/or actuation of an accessory or function in response to a determination of the user stepping at or on the icon or in a manner that otherwise activates the accessory or function. Optionally, the light module and/or illumination source or sources may have a dimming control feature or function, such that the illumination source, when activated, is ramped up or progressively powered up to its full illumination state, and when deactivated, is ramped down or dimmed or progressively powered down to its deactivated state.

The illumination source may comprise any suitable illumination source, such as one or more light emitting diodes (LEDs), such as white light-emitting LEDs or high intensity power LEDs (such as the types described in U.S. Pat. Nos. 7,195,381 and/or 6,690,268, which are hereby incorporated herein by reference in their entireties) or organic light emitting diodes (OLEDs) or electroluminescent light sources or one or more lasers or the like. The illumination source may comprise a substantially white light-emitting illumination source, or may comprise a colored light-emitting illumination source (or a white light-emitting illumination source may emit light that passes through a color filter or the like) to provide color illumination (such as blue or other color as desired) at the vehicle side area depending on the particular application of the illumination module. For example, the illumination module may emit or transmit colored light that may match or correspond to the interior and/or exterior lighting of the particular vehicle to which the illumination module is mounted.

The illumination module may provide a cover and icon film or template that provides a display of a vehicle logo or the like (or any other vehicle logo or brand name or custom display icon or the like). Thus, the illumination modules may provide a back lit icon or indicia or logo or emblem to provide enhanced ground illumination at the side of a vehicle. The icon or indicia or logo or emblem may comprise the vehicle manufacturer logo or the like, or may comprise a selected icon or indicia or logo, such as may be selected by the owner of the vehicle. For example, the owner of the vehicle may select a module having a desired icon or indicia or logo element or optic and the selected illumination module may be installed in the vehicle door handle and/or mirror assembly (or elsewhere on the vehicle, such as at or on or in the vehicle door or at or on or in a side panel of the vehicle or the like) to provide the customized or personalized ground illumination function. Such a selection and installation of the illumination module may be performed during manufacturing of the vehicle or as an aftermarket change to the vehicle. The icon illumination module thus may provide a personalized or customized illumination at the side of the vehicle, such as by utilizing aspects of the systems and assemblies described in U.S. Pat. Nos. 7,626,749; 7,255,451 and/or 7,289,037, which are hereby incorporated herein by reference in their entireties.

Optionally, and desirably, the cover and/or housing may be overmolded over the illumination source or sources and circuitry to provide a substantially sealed and substantially water impervious illumination module. For example, the housing may be overmolded over and around a metal stamping or stamped circuit element or plate with the illumination source or sources (such as LEDs or the like) fastened thereto or otherwise established thereon, or the housing may be overmolded over and around a printed circuit board or element with the illumination sources established thereon.

Figure 21:
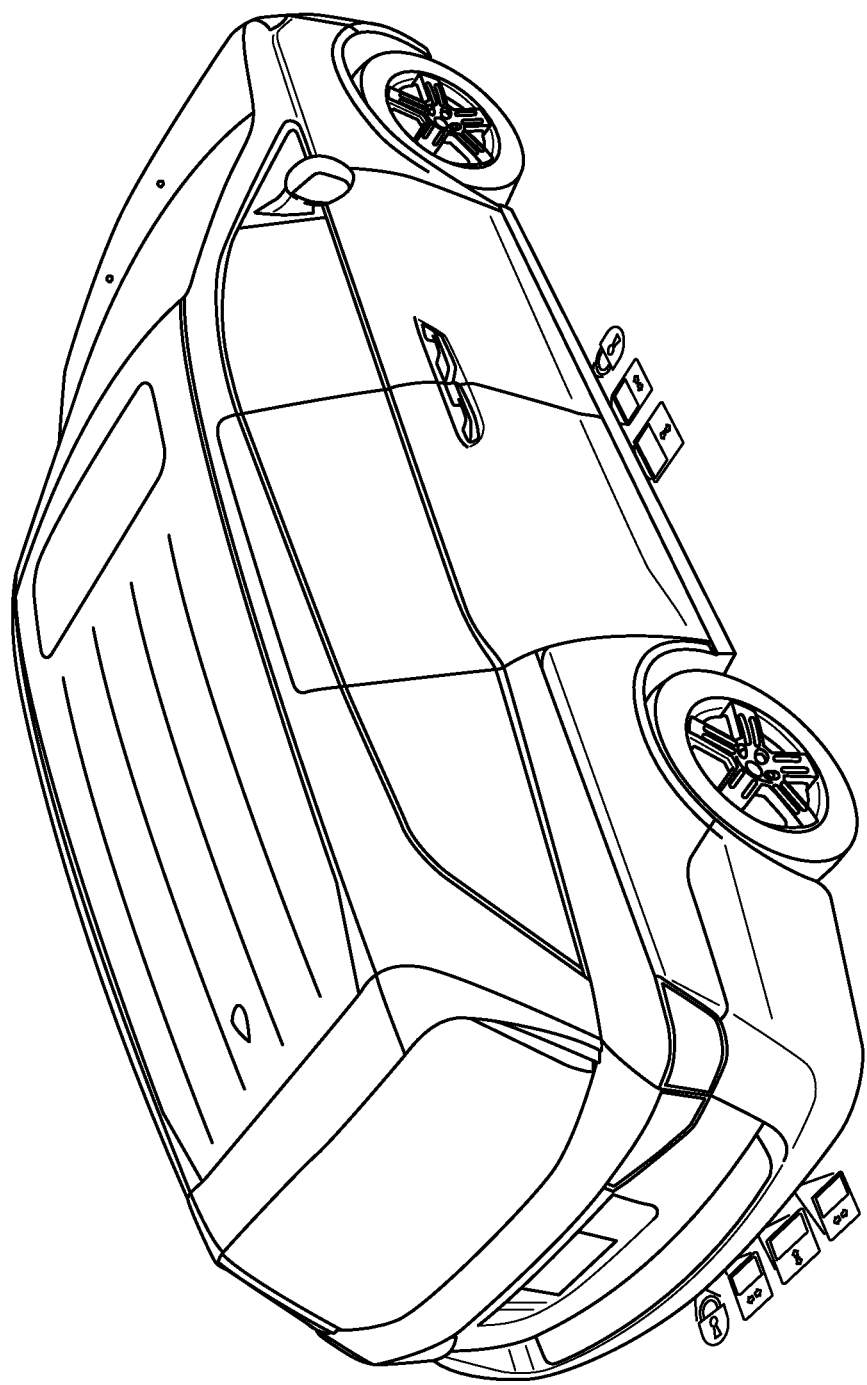
FIG. 21 is a perspective view of a vehicle equipped with a projecting and sensing module of the present invention.
Figure 22:
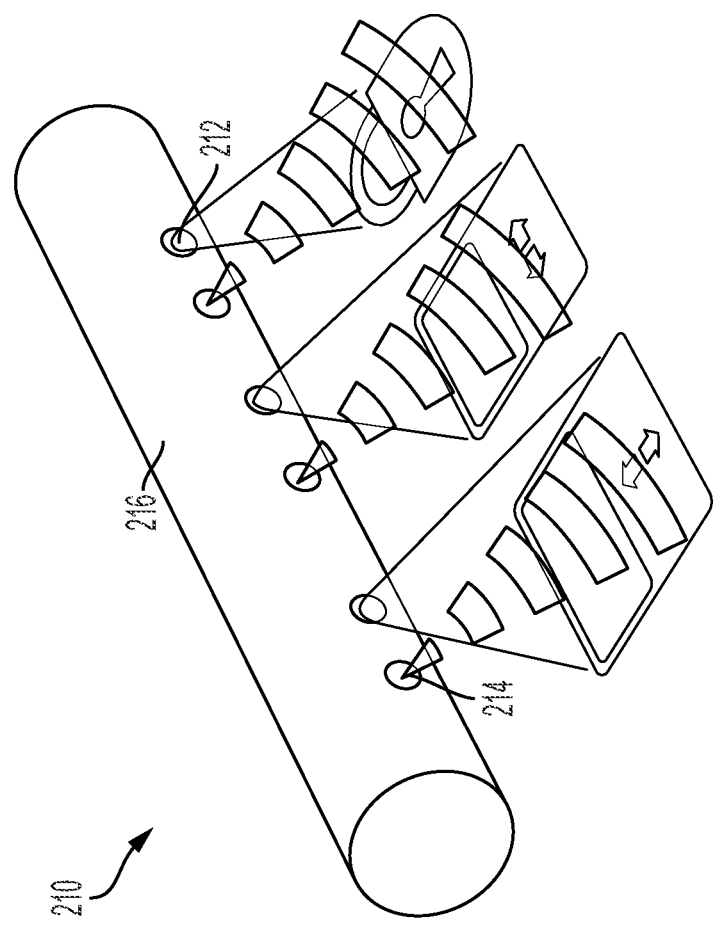
FIG. 22 is a perspective view of a projecting and sensing module of the vehicle of FIG. 21.

Optionally, an illumination and sensing module or unit may comprise multiple sensors and multiple illumination sources, which may project icons onto the ground or may backlight or illuminate icons at the vehicle. For example, and such as shown in FIGS. 21 and 22, a module 210 includes projectors 212 and sensors 214 and a controller, which is operable to communicate with a body control module of the vehicle (such as via a vehicle data bus or the like), such as described above. The body control module is in communication with a door actuator and a lock actuator of the vehicle. In the illustrated embodiment, the module 210 comprises an elongated body or housing or construction 216 that is disposed at a lower rocker panel of a vehicle or at a bumper of a vehicle or the like. The elongated body 216 is received in the vehicle structure so that the projecting ports and sensing ports may align with ports or light transmitting portions or apertures of the vehicle structure. The module 210 may otherwise be similar to the devices and modules and systems described above, such that a detailed discussion of the illumination and sensing modules need not be repeated herein.

Figure 23:
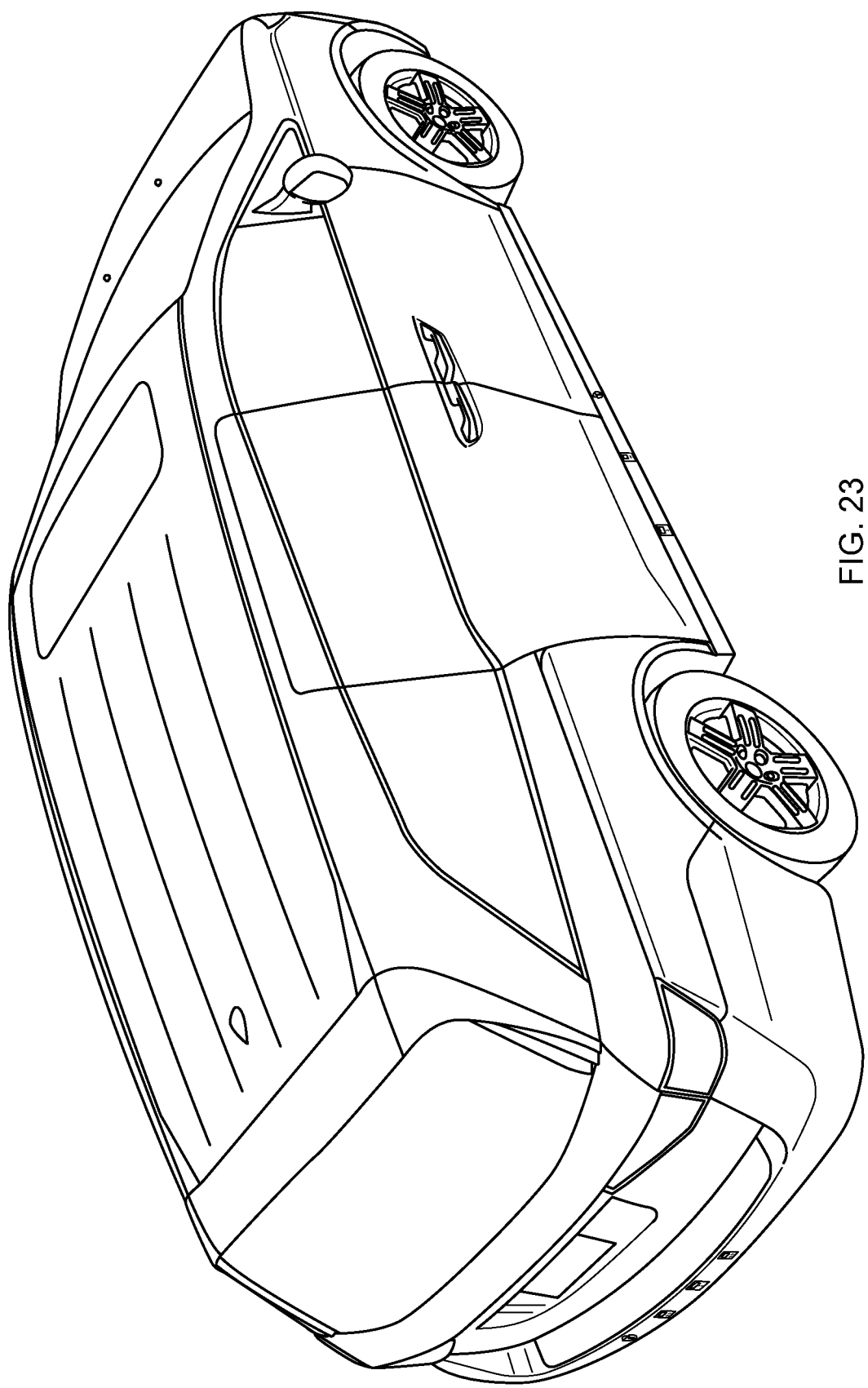
FIG. 23 is a perspective view of a vehicle equipped with a backlighting/projecting and sensing module of the present invention, shown with the backlighting/projecting and sensing modules disposed at a passenger side rocker panel and at the rear bumper of the vehicle.
Figure 24:
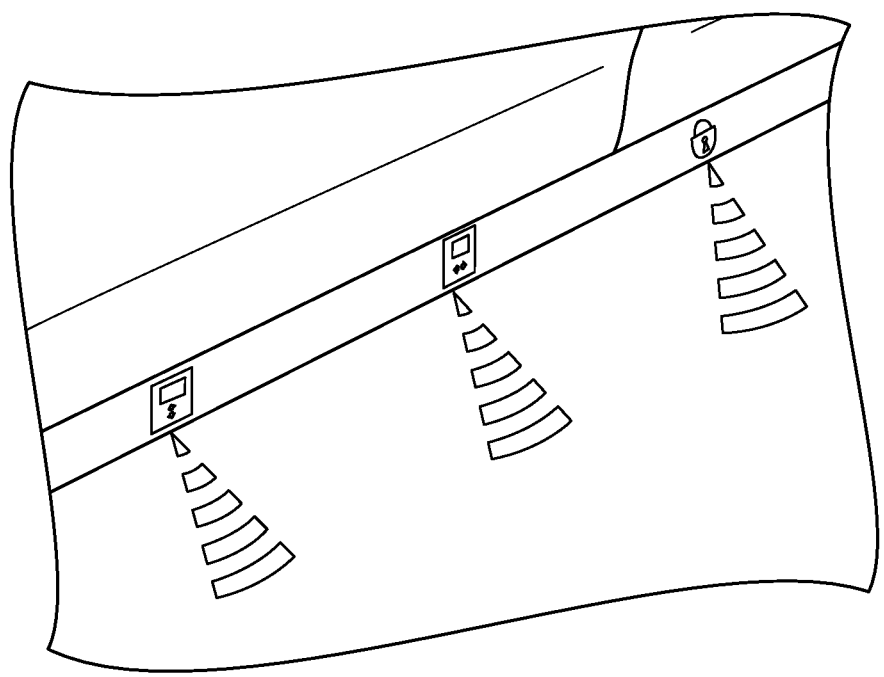
FIG. 24 is an enlarged perspective view of the lower region of the vehicle of FIG. 23, showing the backlit icons at the vehicle rocker panel.
Figure 25:
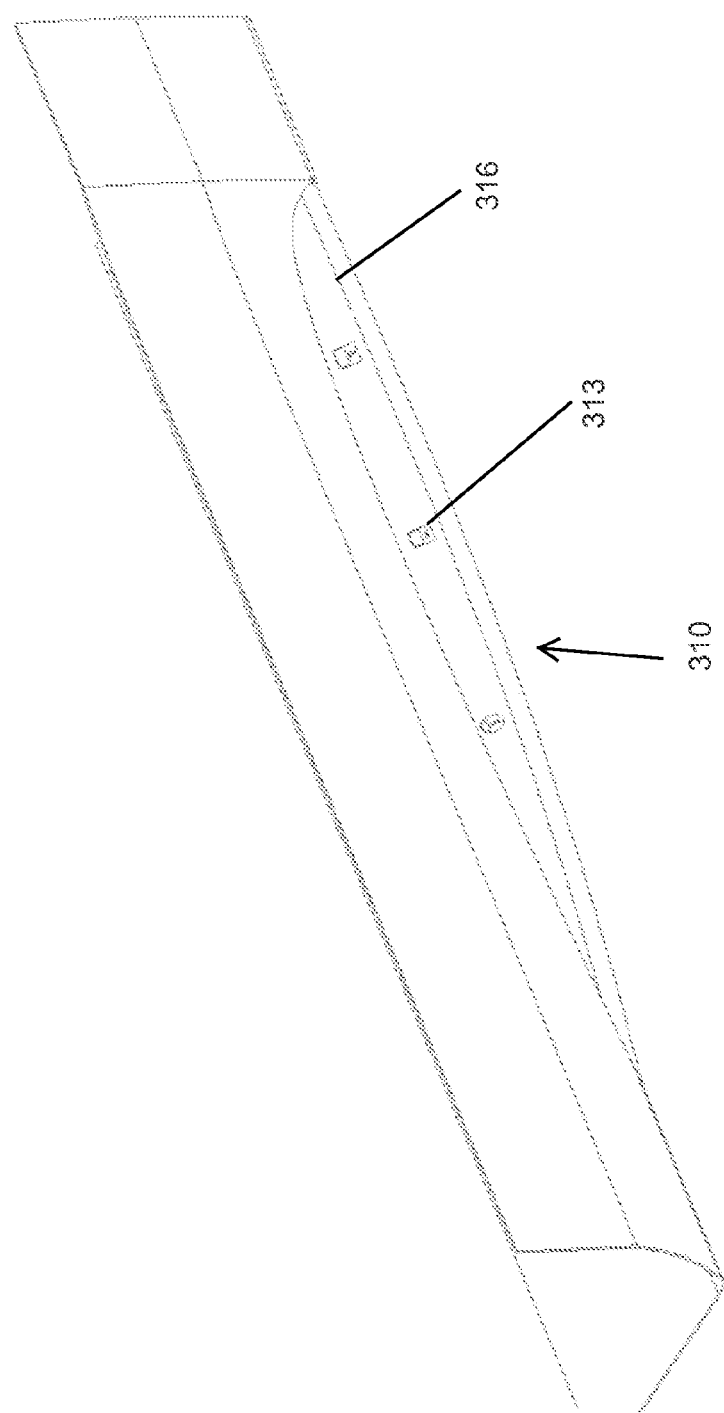
FIG. 25 is a perspective view of the backlighting/projecting and sensing module of the present invention, shown at a lower portion or rocker panel of a vehicle.

Optionally, the illumination and sensing module or unit may operate to backlight icons established at the vehicle structure or housing of the module, such that the icons are (when backlit by the illumination sources of the module) visible at the vehicle structure. For example, and with reference to FIGS. 23-29, a module 310 includes illumination modules or devices or icon display modules or devices 312 and sensors 314 and a controller, which is operable to communicate with a body control module of the vehicle (such as via a vehicle data bus or the like), such as described above. The body control module is in communication with a door actuator and a lock actuator of the vehicle. The module is configured to be disposed at a lower rocker panel of a vehicle or at a bumper of a vehicle or the like, such as shown in FIG. 23.

Figure 28:
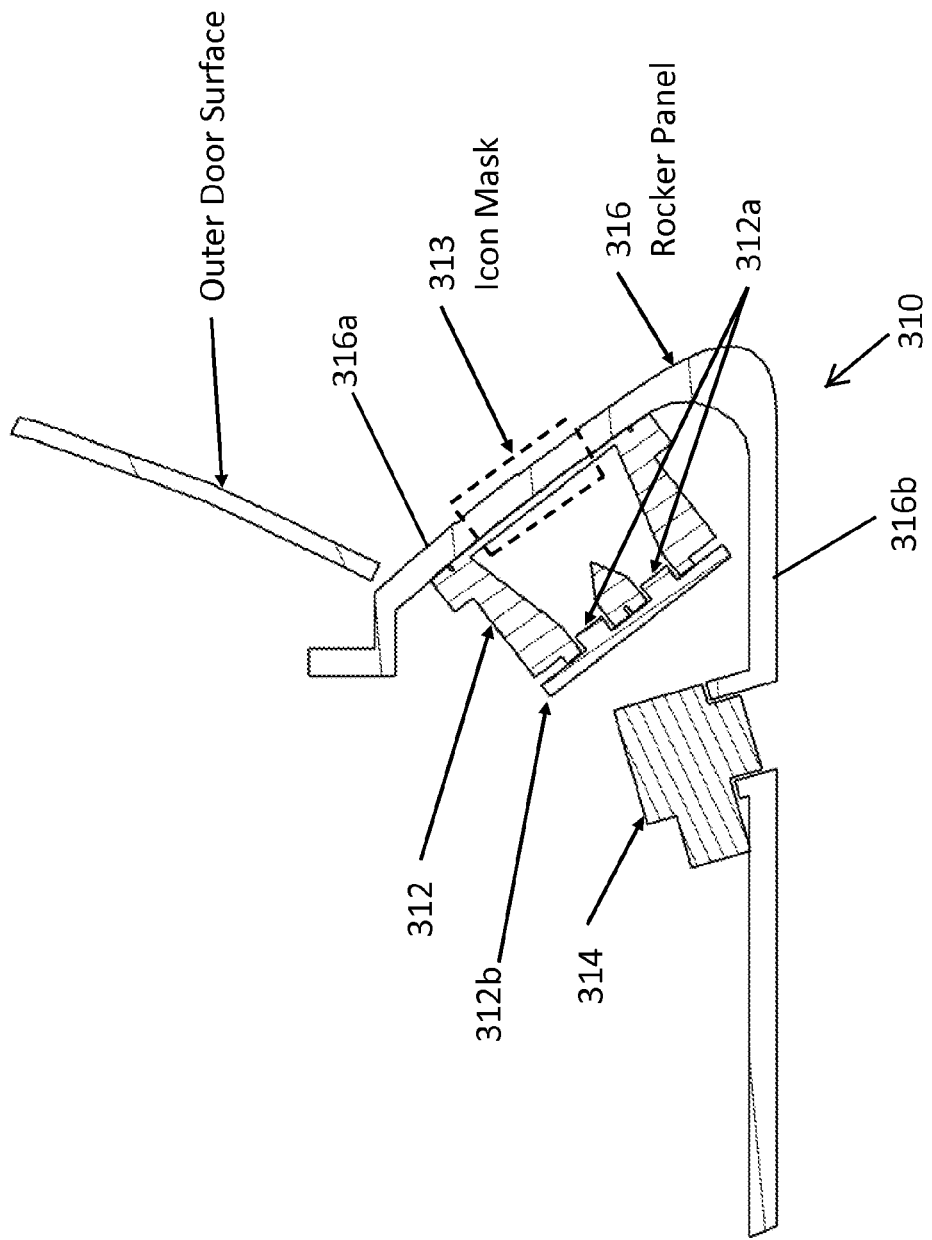
FIG. 28 is an enlarged sectional view of the backlighting/projecting and sensing module of FIG. 27A.
Figure 29:
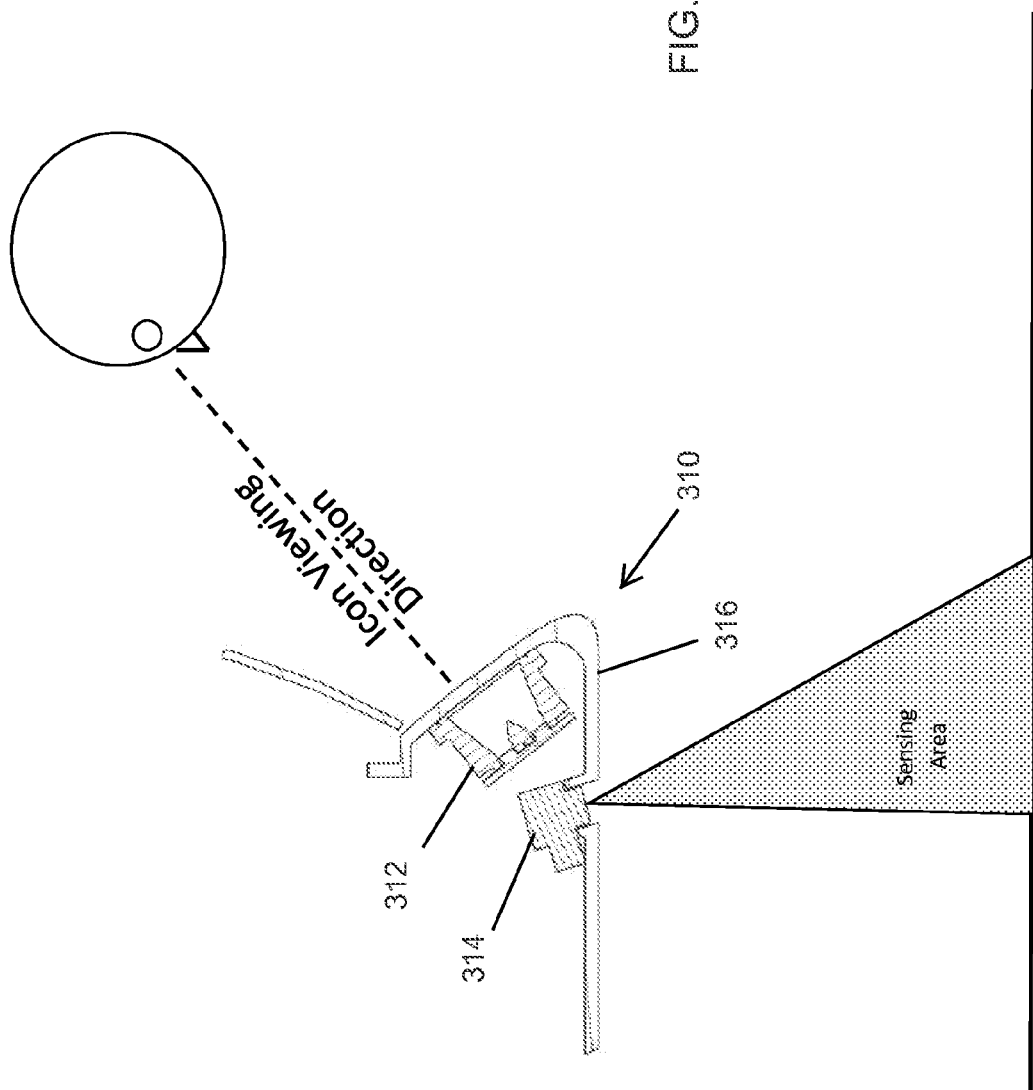
FIG. 29 is another sectional view of the backlighting/projecting and sensing module, shown at the vehicle and with a person viewing the backlit icons.

In the illustrated embodiment of FIGS. 23-29, the module comprises an elongated body or housing or construction 316 that is configured to be disposed at and part of the lower rocker panel of the vehicle, with an outer wall or portion 316a of the housing 316 having translucent or transparent regions that allow the illumination devices 312 to backlight respective icons or masks at the outer wall or portion of the housing, such that the backlit icons (when the illumination sources are activated) are viewable and discernible at the vehicle rocker panel to a person viewing the vehicle rocker panel at a side region adjacent to the vehicle (such as shown in FIG. 29). The sensors are disposed at or near the respective icons and are directed generally downwardly towards the ground at the side region adjacent to the vehicle, such that, when the icons are backlit, a user may place his or her foot at the ground area generally at or beneath the appropriate or selected icon to actuate the desired feature (such as door lock/unlock or open/close function or the like). When the illumination sources are deactivated, the icons are not backlit and thus may not be readily viewable at the rocker panel (or may be less viewable as compared to when they are backlit).

In the illustrated embodiment, and as best shown in FIG. 28, the illumination devices or icon display modules or devices 312 are disposed behind the upper and outer wall 316a of the rocker panel or housing 316. The illumination device 312 includes one or more light emitting diodes (LEDs) 312a disposed at a circuit element or board or PCB 312b, whereby the illumination devices 312 are disposed at the housing or panel 316 with an icon or mask 313 established at the housing and generally at where the illumination device is located. Thus, when the LEDs 312a are activated, light emitted by the LEDs backlights the icon mask 313 so that the icon is viewable at the rocker panel 316 below the lower outer side door surface.

Figure 26:
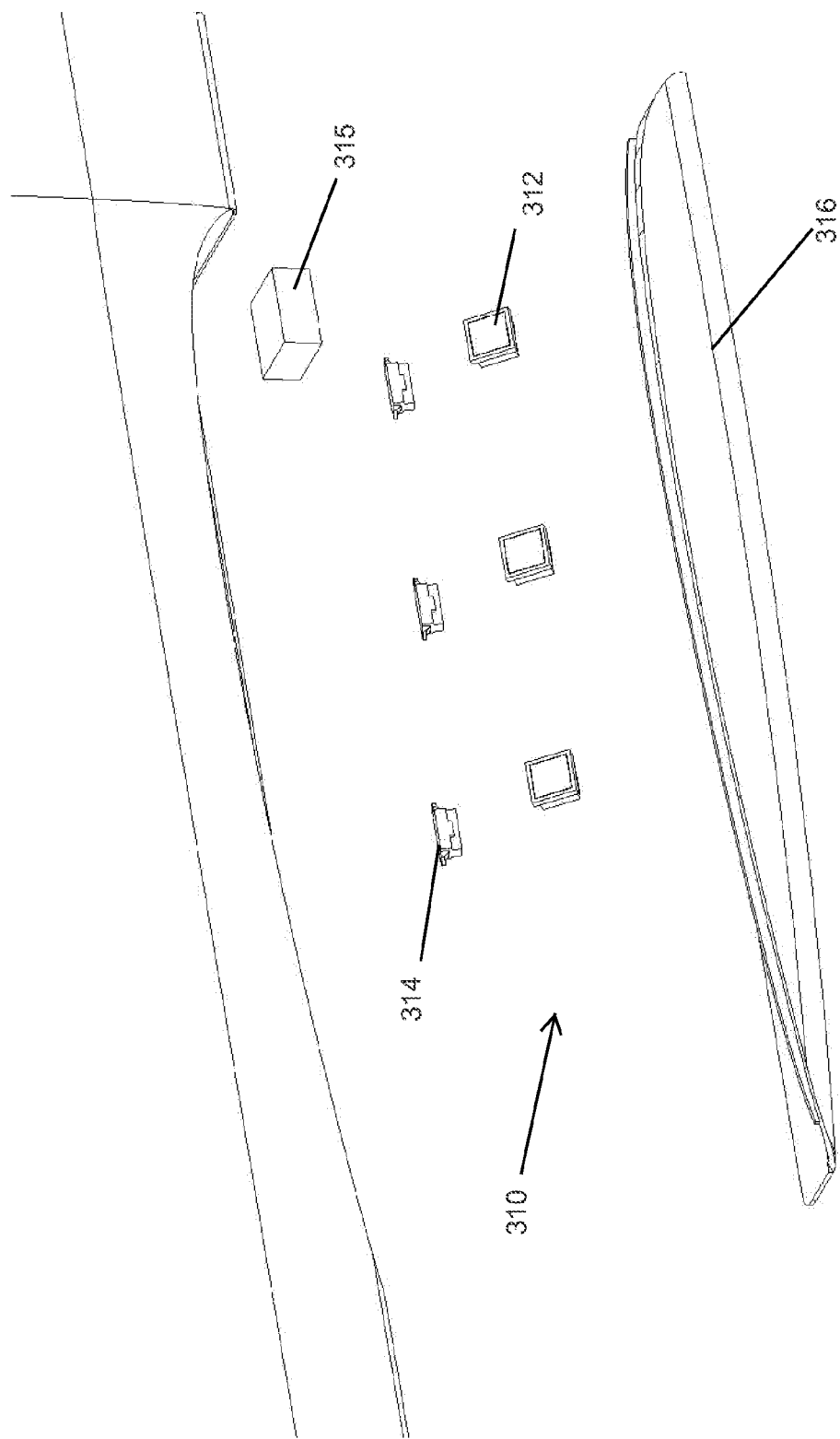
FIG. 26 is an exploded view of the backlighting/projecting and sensing module of FIG. 25.
Figure 27:
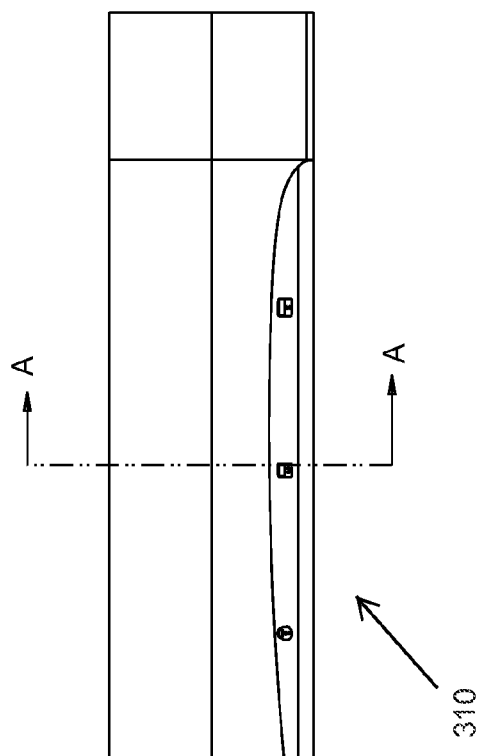
FIG. 27 is a side elevation of the backlighting/projecting and sensing module of FIG. 25.
Figure 27A:
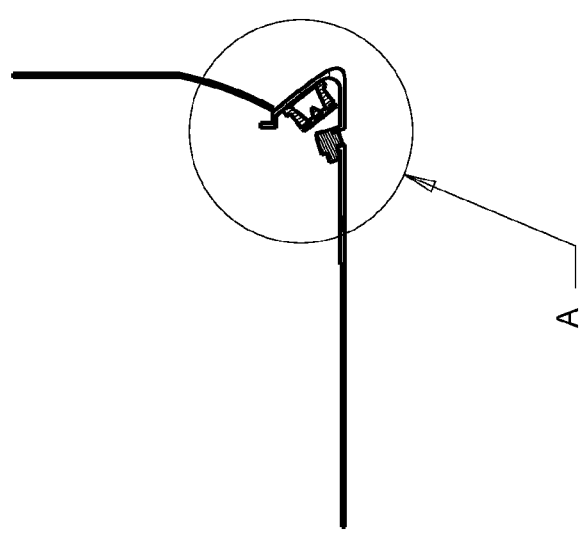
FIG. 27A is a sectional view of the backlighting/projecting and sensing module, taken along the line A-A of FIG. 27.

As also best shown in FIG. 28, the sensing device or sensor 314 is disposed at a lower wall or panel 316b of rocker panel 316 (such as at an aperture at the lower panel) and is directed generally downwardly and sidewardly towards a ground region at or near the side of the vehicle. The sensor 314 is operable to sense or detect the presence of a user's foot that may be positioned at or near the ground below the sensor and its respective or associated icon. The illumination device or module 312 and the foot sensor 314 may operate in a similar manner as discussed above, such that a detailed discussion of the illumination device and sensor and sensing system need not be repeated herein. Because the illumination device and sensor (and optionally the control/interface 315, such as shown in FIG. 26) are integral with a rocker panel portion 316, the icon display and sensing device or module or system of the present invention may be readily installed or incorporated into a vehicle construction or structure. Optionally, a module or unit (such as similar to that of FIG. 22 may be disposed in and behind a vehicle panel (such as a rocker panel), with the icons and/or illumination sources disposed behind respective translucent or light transmitting portions of the vehicle panel and with the sensors disposed at respective apertures or light transmitting portions of a lower portion of the vehicle panel. Similarly, an icon display and sensor may be integrated into or disposed behind a rear bumper portion of a vehicle to provide a backlit iconistic display at a rear or upper wall or portion of the bumper, with the sensors sensing a user's foot that is placed below the respective sensor and icon, such as in a similar manner as discussed above.

Figure 30:
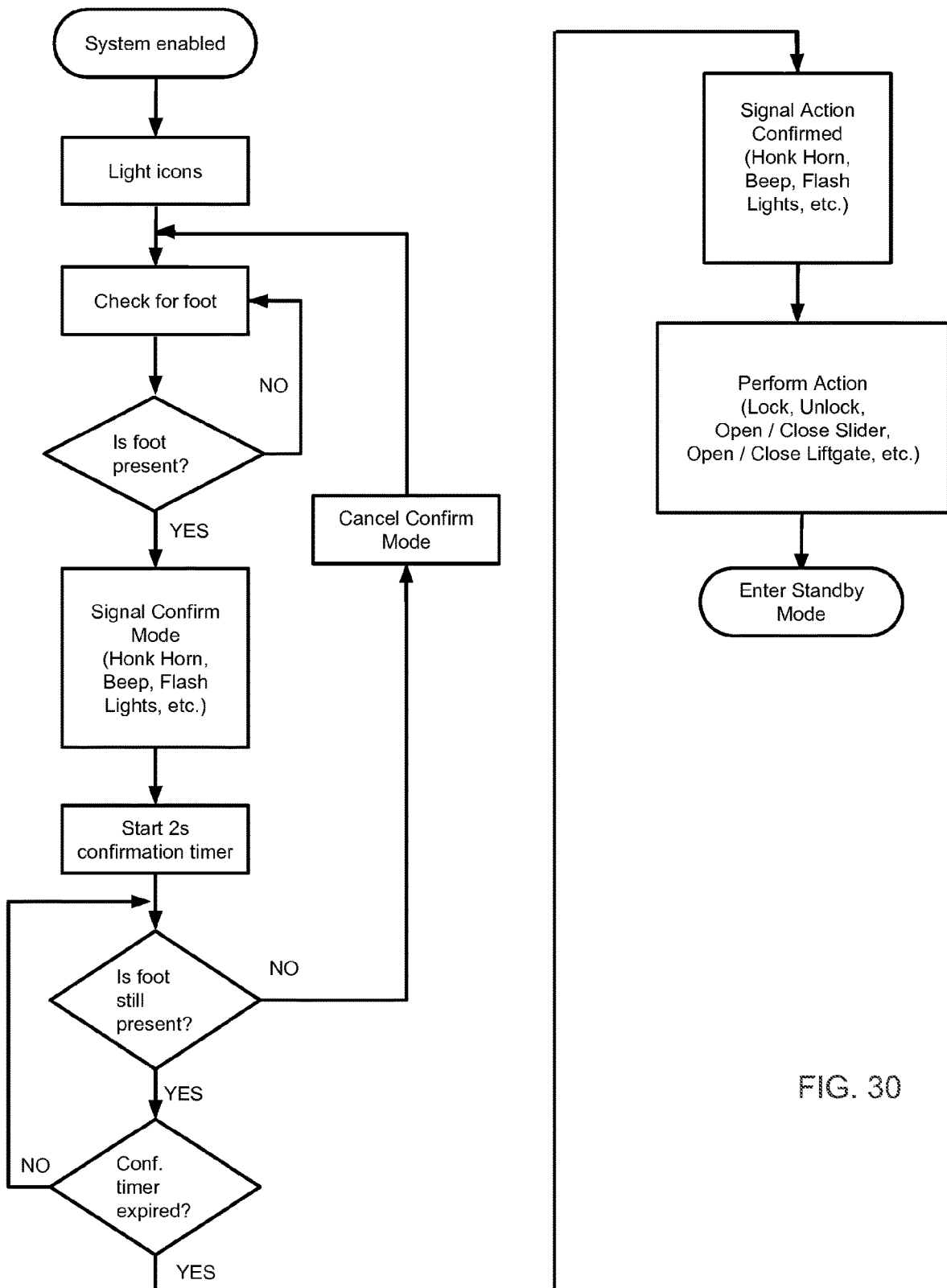
FIG. 30 is a flow chart of the projecting/backlighting and sensing system in accordance with the present invention.

Optionally, the control system may be operable to determine when a foot is present and may provide a confirmation signal to the user to confirm that the foot was detected. The system may signal the user when the foot is detected, and may only activate the associated function after the foot is determined to be present for a threshold period of time. For example, and with reference to FIG. 30, a sensing system may be enabled and may illuminate the icons (such as via backlighting or projecting the icons), whereby the sensing system operates to sense the areas beneath the icons to determine when a foot is present at the sensing area. If the foot is determined to be present, the system may provide a confirmation signal, such as honking the vehicle's horn or flashing lights or the like, and may start a confirmation timer to determine if the foot remains present at the sensing area for a threshold period of time (such as at least about two seconds or thereabouts). If the foot is not present for the threshold time period, the confirm mode is canceled and the system continues to check for the presence of a user's foot at the sensing areas. If the foot is present for the threshold period of time, then the system may generate an action confirmed signal (such as honking the vehicle's horn or flashing lights or the like), and may then perform the selected action or function (such as locking or unlocking a vehicle door or opening or closing a slider door or lift gate or the like). After the selected or appropriate action or function is completed, the system may enter a standby mode.

Thus, an illumination and sensing device or module in accordance with aspects of the present invention comprises a small illumination device or module that is disposed at an exterior rearview mirror or vehicle lift gate or vehicle rocker panel, and is operable to backlight an icon at the panel or backlight or project an icon or image towards a ground area at or near the side or rear of the vehicle. The illumination or backlighting intensity may be low enough to provide a glow at the logo or icon or beacon, yet high enough to be seen or discerned in high ambient or daytime lighting conditions. Optionally, the backlighting intensity may be controlled or adjusted or varied, such as in response to an ambient light sensor, so that the backlighting intensity is increased during daytime lighting conditions and decreased or activated at a reduced intensity during nighttime lighting conditions. The module may include multiple illumination devices and a corresponding number of sensing devices for sensing the presence of a user's foot at the ground area associated with the respective illumination devices. The system may delay actuation of the function until the system determines that the foot is present for a threshold amount of time (to limit or substantially preclude erroneous activation of the functions when a user's foot or other object passes over the sensed ground area). The system may provide confirmation signals (such as visual signals or audible signals) to the user to confirm to the user that the foot is sensed and/or that the foot is sensed for the threshold period of time.

The illumination module may provide the desired lighting function via any suitable means. For example, the illumination module may be disposed at an exterior mirror assembly or vehicle rocker panel and may project icons onto the ground or onto a structure or panel of the vehicle (and may project smaller and brighter icons to enhance visibility of the icons at the ground area during daytime lighting conditions). The illumination module may project light via one or more light emitting diodes or lasers, and the mask or optic may comprise any suitable mask or optic for projecting the desired icon or indicia at the ground or panel of the vehicle. For example, the optic may comprise a tailored freeform lens or optic, with an LED or laser emitting light therethrough (such as by utilizing aspects of the light modules described in U.S. patent application Ser. No. 14/615,821, filed Feb. 6, 2015 and published Aug. 13, 2015 as U.S. Publication No. US-2015-0224919, which is hereby incorporated herein by reference in its entirety), or the optic may comprise a diffracting optical element (DOE) with one or more LEDs or a laser emitting light therethrough (where, for example, the module may project a dimmer icon and one very bright dot with one laser, and the DOE would allow for the location of the icon to be seen during brighter lighting conditions without requiring a high-powered laser) or the like.

Optionally, the system may project or emit a beam or beams of light onto icons established at the vehicle (such as icons painted or molded at the vehicle rocker panel or bumper or the like, which would be visible during daytime lighting conditions and illuminated at nighttime lighting conditions via one or more light sources or LEDs), or the system may include modules disposed at the rocker panel or the like that backlight icons so that the backlit icons are viewable at the vehicle rocker panel or the like. Optionally, in order to enhance visibility of the projected icons during daylight conditions, the module may project icons onto the ground and may include a laser that emits a narrow beam of higher intensity light at the ground where the icons are projected (or optionally, only the laser beams are emitted during daytime lighting conditions), and optionally the appropriate laser beam may flash to provide the confirmation feedback that the function associated with an icon was selected and actuated.

Optionally, a dual or 2-in-1 projection light module (capable of projecting an icon and other illumination at the ground area) may be used that projects the icon at the ground and uses otherwise unused light from the light source to create a small bright dot at the ground (such as at the center of each icon) that could be seen in brighter or daytime lighting conditions, with the module including lenses and reflectors that emit the light beams and icons in the desired pattern (such as by utilizing aspects of the light modules described in U.S. Pat. No. 8,801,245 and/or U.S. patent application Ser. No. 14/615,821, filed Feb. 6, 2015 and published Aug. 13, 2015 as U.S. Publication No. US-2015-0224919, which are hereby incorporated herein by reference in their entireties). Thus, using aspects of the light modules described in U.S. Pat. No. 8,801,245 and/or U.S. patent application Ser. No. 14/615,821, the light emitted by the light source or LED or the like may be focused to provide a bright dot at or near the projected icon (instead of using the light to provide ground illumination around the projected icon). This could be achieved using two separate light sources or LEDs or a single light source or LED, depending on the lenses and reflectors used in the module.

Optionally, the illumination modules and/or an exterior rearview mirror assemblies of the vehicle may incorporate a blind spot indicator device or element and/or a turn signal indicator device or element, such as by utilizing aspects of the devices described in U.S. Pat. Nos. 8,786,704; 8,058,977; 7,944,371; 7,492,281; 6,198,409; 5,929,786 and/or 5,786,772, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties. Optionally, the exterior rearview mirror assembly may include a wide angle reflector at or integral with the reflective element, such as by utilizing aspects of the elements described in U.S. Pat. Nos. 8,786,704; 7,748,856; 7,255,451; 7,195,381; 6,717,712; 7,126,456; 6,315,419; 7,097,312 and/or 6,522,451, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular sensing device for a vehicular function control system, the vehicular sensing device comprising:
   at least one illumination source operable to backlight a plurality of icons at a cover element;
   wherein, with the vehicular sensing device disposed at a vehicle, and with the at least one illumination source activated to backlight the plurality of icons, the backlit icons are viewable at an exterior portion of the vehicle;
   wherein each icon of the plurality of icons is representative of a respective vehicle function;
   a plurality of sensors, wherein, with the vehicular sensing device disposed at the vehicle, each sensor of the plurality of sensors has a respective field of sensing associated with a respective icon of the plurality of icons;
   a controller operable to generate an output responsive to the plurality of sensors; and
   wherein, with the vehicular sensing device disposed at the vehicle, and with the at least one illumination source activated to backlight the icons at the cover element, and responsive to sensing by one of the sensors of proximity or movement of a user in the field of sensing of that sensor, the controller generates the output to control the vehicle function that is represented by the respective backlit icon associated with that sensor.

2. The vehicular sensing device of claim 1, comprising a housing, wherein the at least one illumination source and the plurality of sensors are disposed in the housing.

3. The vehicular sensing device of claim 1, wherein the at least one illumination source comprises a plurality of light emitting diodes, and wherein each light emitting diode of the plurality of light emitting diodes backlights a respective icon of the plurality of icons.

4. The vehicular sensing device of claim 1, wherein, with the vehicular sensing device disposed at the vehicle, and with the at least one illumination source activated to backlight the icons, the backlit icons are viewable at the exterior portion of the vehicle above the fields of sensing of the respective sensors.

5. The vehicular sensing device of claim 1, wherein, with the vehicular sensing device disposed at the vehicle, and with the at least one illumination source activated to backlight the icons, the backlit icons are viewable at an upper exterior portion of the vehicle and the fields of sensing of the sensors are below the respective backlit icons.

6. The vehicular sensing device of claim 1, wherein, with the vehicular sensing device disposed at the vehicle, and with the at least one illumination source activated to backlight the icons, the backlit icons are viewable at an upper exterior portion of the vehicle and the fields of sensing of the sensors are directed downward toward the ground below the respective backlit icons.

7. The vehicular sensing device of claim 1, wherein, with the vehicular sensing device disposed at the exterior portion of the vehicle, and with the at least one illumination source activated to backlight the icons, the fields of sensing of the sensors are directed downward toward the ground below the respective backlit icons.

8. The vehicular sensing device of claim 1, wherein the controller, responsive to sensing by one of the sensors of proximity or movement of the user in the field of sensing of that sensor, communicates the output to a body control module of the vehicle.

9. The vehicular sensing device of claim 1, wherein the controller is part of a body control module of the vehicle.

10. The vehicular sensing device of claim 1, wherein the icons are associated with at least one selected from the group consisting of (i) a vehicle door opening function, (ii) a vehicle door closing function, (iii) a vehicle window opening function, (iv) a vehicle window closing function, (v) a vehicle door locking function, and (vi) a vehicle door unlocking function.

11. The vehicular sensing device of claim 1, wherein the controller is operable to activate the at least one illumination source to backlight the icons responsive to a passive entry system or keyless entry system of the vehicle.

12. The vehicular sensing device of claim 11, wherein the controller is operable to deactivate the at least one illumination source.

13. The vehicular sensing device of claim 1, wherein the controller is operable to flash the at least one illumination source when the user is sensed in the field of sensing of the sensor.

14. The vehicular sensing device of claim 1, wherein the cover element comprises an exterior vehicle panel at the exterior portion of the vehicle.

15. The vehicular sensing device of claim 1, wherein the cover element comprises light-transmissive regions, and wherein, with the vehicular sensing device disposed at the vehicle, and with the at least one illumination source activated, light emitted by the at least one illumination source passes through the light-transmissive regions so as to be viewable at the exterior portion of the vehicle.

16. The vehicular sensing device of claim 1, wherein the exterior portion of the vehicle comprises a bumper of the vehicle, and wherein, with the vehicular sensing device disposed at the vehicle, the at least one illumination source backlights the icons for viewing at an upper portion of the bumper of the vehicle and the sensors sense proximity or movement of the user below the bumper of the vehicle.

17. The vehicular sensing device of claim 1, wherein the exterior portion of the vehicle comprises a rocker panel of the vehicle, and wherein, with the vehicular sensing device disposed at the vehicle, the at least one illumination source backlights the icons for viewing at an upper portion of the rocker panel of the vehicle and the sensors sense proximity or movement of the user below the rocker panel of the vehicle.

18. The vehicular sensing device of claim 1, wherein the exterior portion of the vehicle comprises an exterior mirror assembly of the vehicle, and wherein, with the vehicular sensing device disposed at the vehicle, the at least one illumination source backlights the icons for viewing at an upper portion of the exterior mirror assembly of the vehicle and the sensors sense proximity or movement of the user below the exterior mirror assembly of the vehicle.

19. The vehicular sensing device of claim 1, wherein the exterior portion of the vehicle comprises a door handle of the vehicle, and wherein, with the vehicular sensing device disposed at the vehicle, the at least one illumination source backlights the icons for viewing at an upper portion of the door handle of the vehicle and the sensors sense the proximity or movement of the user below the door handle of the vehicle.

20. The vehicular sensing device of claim 1, wherein the exterior portion of the vehicle comprises a panel of the vehicle, and wherein, with the vehicular sensing device disposed at the vehicle, at least one of the at least one illumination source and the plurality of sensors is disposed behind the panel of the vehicle.

21. The vehicular sensing device of claim 1, wherein the at least one illumination source, when activated, backlights a logo icon at the cover element, and wherein the logo icon comprises at least one selected from the group consisting of (i) a vehicle logo, (ii) a brand name and (iii) a customized icon.

22. The vehicular sensing device of claim 1, wherein, with the vehicular sensing device disposed at the vehicle, each sensor of the plurality of sensors has the respective field of sensing directed towards the ground.

23. The vehicular sensing device of claim 1, wherein each sensor of the plurality of sensors has the respective field of sensing directed to sense a foot or a hand of the user.

24. A vehicular iconistic display device comprising:
at least one illumination source operable to backlight at least one icon of the vehicular iconistic display device;
at least one sensor, each sensor of the at least one sensor has a field of sensing;
wherein, with the vehicular iconistic display device disposed at a vehicle, and with the at least one illumination source activated to backlight the at least one icon, the backlit at least one icon is viewable at an exterior portion of the vehicle;
wherein the at least one icon comprises at least one selected from the group consisting of (i) a vehicle logo, (ii) a brand name and (iii) a customized icon; and
wherein, with the vehicular sensing device disposed at the vehicle, and with the at least one illumination source activated to backlight the at least one icon, and responsive to sensing by the at least one sensor of proximity or movement of a user in the field of sensing of that sensor, the vehicular iconistic display device generates an output.

25. The vehicular iconistic display device of claim 24, comprising a plurality of other icons and a plurality of other sensors associated with the other icons, and wherein, with the vehicular iconistic display device disposed at the vehicle, each other sensor of the plurality of other sensors has a respective field of sensing associated with a respective icon of the plurality of other icons, and wherein, with the vehicular iconistic display device disposed at the vehicle, and with the at least one illumination source activated to backlight the other icons, and responsive to sensing by one of the other sensors of proximity or movement of the user in the field of sensing of that other sensor, another output is generated for control of a vehicle function that is represented by the respective backlit other icon associated with that other sensor.

26. The vehicular iconistic display device of claim 25, wherein the other icons are associated with at least one selected from the group consisting of (i) a vehicle door opening function, (ii) a vehicle door closing function, (iii) a vehicle window opening function, (iv) a vehicle window closing function, (v) a vehicle door locking function, and (vi) a vehicle door unlocking function.

27. The vehicular iconistic display device of claim 24, wherein the vehicular iconistic display device activates the at least one illumination source to backlight the at least one icon responsive to a passive entry system or keyless entry system of the vehicle.

28. The vehicular iconistic display device of claim 24, wherein the vehicular iconistic display device is disposed at an exterior vehicle panel at the exterior portion of the vehicle.

29. The vehicular iconistic display device of claim 24, further comprising a cover element comprising light-transmissive regions, and wherein, with the vehicular iconistic display device disposed at the vehicle, and with the at least one illumination source activated, light emitted by the at least one illumination source passes through the light-transmissive regions so as to be viewable at the exterior portion of the vehicle.

30. The vehicular iconistic display device of claim 29, wherein the cover element comprises an exterior vehicle panel at the exterior portion of the vehicle.

31. The vehicular iconistic display device of claim 24, wherein the at least one icon comprises a customized icon that is selected by an owner of the vehicle.

\* \* \* \* \*